US007561954B2

(12) United States Patent
Aizawa et al.

(10) Patent No.: US 7,561,954 B2
(45) Date of Patent: Jul. 14, 2009

(54) CREEP DRIVE CONTROL DEVICE FOR DRIVING VEHICLE AT CREEP SPEED

(75) Inventors: Hiroaki Aizawa, Anjo (JP); Shinsuke Sakane, Handa (JP); Masashi Kishimoto, Chiryu (JP); Yuzo Imoto, Chita-gun (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/648,805

(22) Filed: Aug. 27, 2003

(65) Prior Publication Data
US 2004/0215385 A1 Oct. 28, 2004

(30) Foreign Application Priority Data
Aug. 29, 2002 (JP) ............................. 2002-250997

(51) Int. Cl.
*G06F 17/00* (2006.01)
*B60T 7/16* (2006.01)
(52) U.S. Cl. ............................ 701/79; 701/93; 180/170
(58) Field of Classification Search .................. 701/79, 701/93, 96, 97, 98; 180/169, 170, 178, 179; 340/904, 901, 903
See application file for complete search history.

(56) References Cited

U.S. PATENT DOCUMENTS

| 4,961,146 | A | | 10/1990 | Kajiwara |
| 4,969,103 | A | * | 11/1990 | Maekawa .................. 701/96 |
| 5,234,071 | A | * | 8/1993 | Kajiwara .................. 180/169 |
| 5,771,478 | A | | 6/1998 | Tsukamoto et al. |
| 6,302,823 | B1 | | 10/2001 | Eckert et al. |
| 6,339,740 | B1 | * | 1/2002 | Seto et al. ................. 701/96 |
| 6,590,299 | B2 | | 7/2003 | Kuang et al. |
| 6,769,504 | B2 | * | 8/2004 | Kobayashi et al. .......... 180/169 |
| 7,025,708 | B2 | | 4/2006 | Rieger et al. |
| 7,035,727 | B2 | | 4/2006 | De La Salle et al. |
| 2002/0020247 | A1 | * | 2/2002 | Kojima et al. .................. 74/512 |
| 2002/0134602 | A1 | * | 9/2002 | Kobayashi et al. .......... 180/169 |

FOREIGN PATENT DOCUMENTS

JP    A-61-247525    11/1986

(Continued)

OTHER PUBLICATIONS

Office Action from Japanese Patent Office issued on Jun. 12, 2007 for the corresponding Japanese patent application No. 2002-250997 (a copy and English translation thereof).

*Primary Examiner*—Khoi H. Tran
*Assistant Examiner*—Ronnie Mancho
(74) *Attorney, Agent, or Firm*—Posz Law Group, PLC

(57) ABSTRACT

A creep drive control device according to the invention sets a target creep vehicle speed when a driver has neither one of an acceleration intention or a stop maintenance intention. An engine output is increased (or decreased) by a vehicle speed increase processing (or a vehicle speed decrease processing), or a braking force is decreased (or increased), and an actual vehicle speed is controlled so as to be equal to the target creep vehicle speed or a value in the proximity thereof. The target creep vehicle speed, and respective engine output and braking force increase amounts and decrease amounts are corrected and set in accordance with driving conditions, road surface conditions and driver operations.

34 Claims, 24 Drawing Sheets

FOREIGN PATENT DOCUMENTS

| | | |
|---|---|---|
| JP | A-62-255252 | 11/1987 |
| JP | A04-365935 | 12/1992 |
| JP | A-06-264783 | 9/1994 |
| JP | A-07-139383 | 5/1995 |
| JP | A-11-063211 | 3/1999 |
| JP | A-2001-114084 | 4/2001 |
| JP | A-2001-310654 | 11/2001 |

* cited by examiner

CREEP DRIVE CONTROL DEVICE FOR DRIVING VEHICLE AT CREEP SPEED

INCORPORATION BY REFERENCE

The disclosure of Japanese Patent Application No. 2002-250997 filed on Aug. 29, 2002 including the specification, drawings and abstract is incorporated herein by reference in its entirety.

1. Field of the Invention

The present invention relates to a creep drive control device for causing a vehicle to drive at a constant creep speed. This creep drive control device can be preferably utilized, for example, for starting on a sloping road.

2. Related Art of the Invention

Conventionally, vehicle starting has been made easier to execute by causing the vehicle to drive at a low speed that is substantially equivalent to a creep speed. However, conventional art does not facilitate easy vehicle starting on upward or downward sloping roads.

Meanwhile, art (e.g., Japanese Patent Application Laid-Open Publication 06-264783) has been disclosed that inhibits a vehicle from slipping backwards on an upward sloping road by making it difficult for the vehicle to go backwards (Japanese Patent Application Laid-Open Publication 06-264783). This is achieved by controlling drive torque such that torque of creep speed drive becomes slightly larger than torque of driving resistance during starting.

However, the object of this conventional art is to inhibit a vehicle from slipping backward on an upward sloping road. Accordingly, this art does not cause a vehicle to drive at a desired low speed, or execute driving control on a downward sloping road.

SUMMARY OF THE INVENTION

It is therefore an object of the invention to provide a creep drive control device that causes a vehicle to starting easily at a low speed that is substantially equivalent to a creep speed, on an upward or downward sloping road.

A creep drive control device according to the present invention executes control such that, when the driver does not have an intention to accelerate the vehicle, or an intention to stop a vehicle and maintain a stopped state of the vehicle, a vehicle speed becomes a value within a fixed range, as a result of adjustment of a braking force that is applied to the vehicle, or/and adjustment of a driving force of the vehicle.

According to this creep drive control device, when the driver does not have the intention to accelerate the vehicle or the intention to stop and maintain a stopped state of the vehicle, the braking force is increased or decreased, or/and the driving force is increased or decreased in order to make the vehicle speed become equal to the value within the fixed range. Accordingly, regardless of the gradient of the road which the vehicle is driving on, namely, regardless of whether the road slopes upward or downward, it is possible to drive the vehicle at a speed that is controlled to be within the fixed range.

Therefore, if this fixed speed is set, for example, to be a low speed that is substantially equivalent to a creep speed of a creep phenomenon generated by a torque converter of a transmission, when the driver intends to accelerate during starting of the vehicle, it is possible to easily execute starting of the vehicle from the creep speed without being constrained by the gradient of the road surface. Moreover, when the driver intends to stop the vehicle and maintain the stopped state, it is possible to smoothly stop the vehicle from the creep speed without being constrained by the gradient of the road surface.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
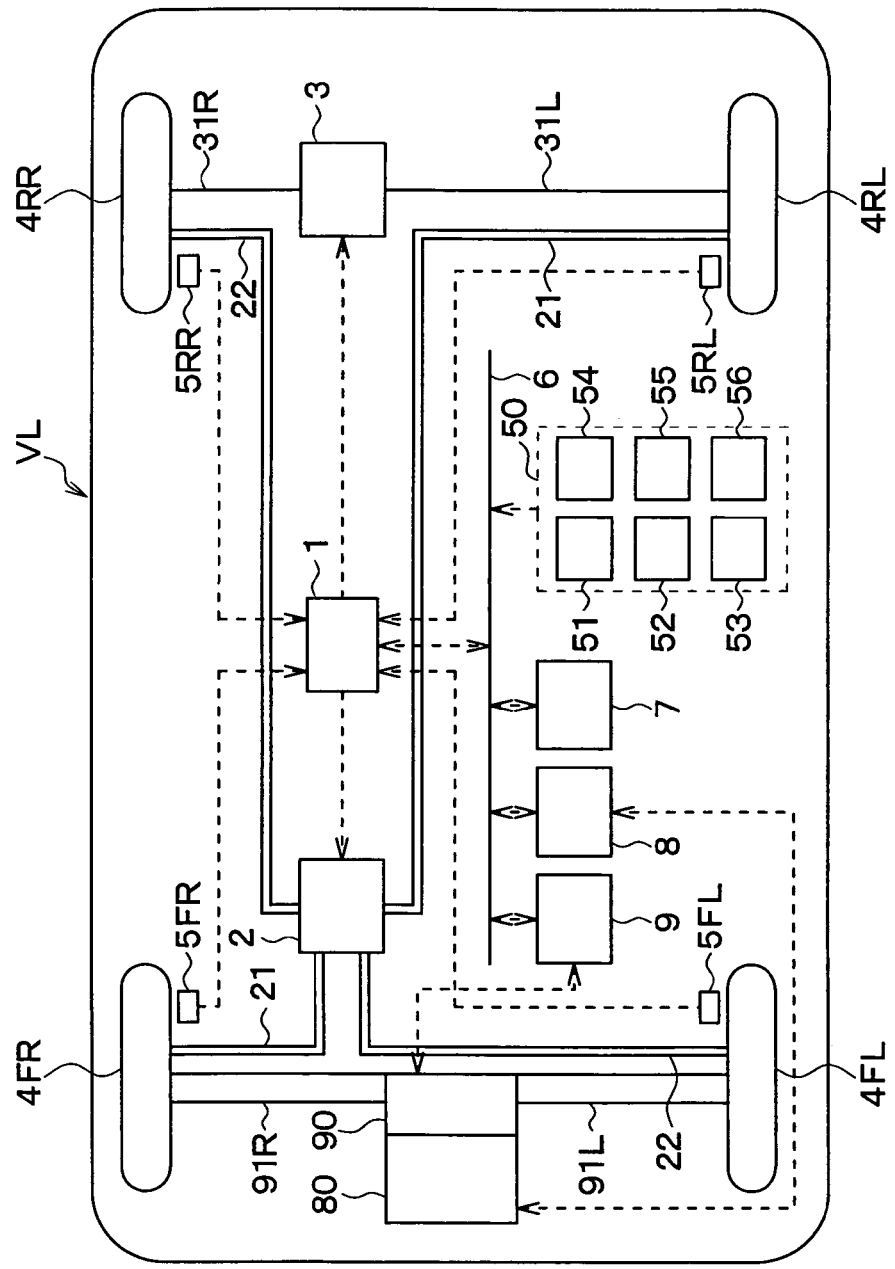
FIG. 1 shows the entire structure of a creep drive control device of a first embodiment according to the present invention.

The present invention will be described further with reference to various embodiments in the drawings.

(First Embodiment)

A creep drive control device of a first embodiment according to the invention will be described with reference to the drawings. FIG. 1 shows the entire structure of the creep drive control device of the first embodiment, in which a front right wheel, front left wheel, rear right wheel and rear left wheel of a vehicle VL are respectively designated as 4FR, 4FL, 4RR, and 4RL.

The vehicle VL shown in FIG. 1 is a front-wheel drive vehicle in which the forward wheels 4FR and 4FL are driven via axles 91R and 91L by an engine 80 and an automatic transmission (hereinafter referred to as "AT") 90.

The creep drive control device is mounted in the vehicle VL. The creep drive control device is provided with a brake control electronic control unit (hereinafter referred to as "ECU") 1; a hydraulic brake device 2 as a first brake unit; a motor-driven parking brake (hereinafter referred to as "motor-driven PKB") 3 as a second brake unit; wheels 4FR and 4RL and wheels 4FL and 4RR that are diagonally connected to the hydraulic brake device 2 by a first brake circuit 21 and a second brake circuit 22, respectively; brake wires 31L and 31R that connect respective brake calipers (not shown) of each of rear wheels 4RL and 4RR to the motor-driven PKB 3. Moreover, the creep drive control device is also provided with vehicle wheel speed sensors 5FR, 5FL, 5RR and 5RL that detect a rotational speed of each wheel; an on-board LAN bus 6 that transmits input and output signals of various electronic instruments; a sensor cluster 50 formed from a variety of sensors connected to the on-board LAN bus 6; a starting assistance control ECU 7; an engine control ECU 8; and an automatic transmission ECU (hereinafter referred to as "AT-ECU") 9.

The brake control ECU 1 corresponds to a braking force control unit of the invention, and is formed from a computer. The brake control ECU 1 calculates brake control amounts used in anti-lock brake system (ABS) control, vehicle stability control (VSC), and traction control (TCS), and the like, based on a vehicle wheel rotation signals of respective wheels 4FR, 4FL, 4RL and 4RR from the vehicle wheel speed sensors 5FR, 5FL, 5RL and 5RR, and each type of sensor signal input via the on-board LAN bus 6 from the sensor cluster 50.

The brake control ECU 1 sends information including a vehicle speed signal, a master cylinder pressure of the hydraulic brake device 2 and a brake pedal operation amount to the starting assistance control ECU 7, described later. The brake control ECU 1 receives the brake control amounts calculated by the starting assistance control ECU 7 based on this information, and then determines respective brake actuation signals (a first brake actuation signal and a second brake actuation signal) based on these brake control amounts. These signals are then output to the hydraulic brake device 2 and the motor-driven PKB 3, and braking force is applied to each of the wheels 4FR, 4FL, 4RL and 4RR.

In addition, the brake control ECU 1 calculates a surface friction coefficient (road surface μ) using a known method based on a slip ratio obtained from a difference between the calculated vehicle wheel speed and a vehicle speed (a vehicle-body speed).

Moreover, according to the invention, the brake control amount indicates a required control amount for obtaining a required braking force or a required deceleration. Moreover, within this specification, the term "brake pressure" corresponds to a wheel cylinder pressure (hereinafter referred to as "W/C pressure") that generates "braking force", and is therefore equivalent to "braking force". For example, a target deceleration that corresponds with a target braking force is converted to a brake pressure based upon the equation of deceleration 1 G=10 MPa, (where, G is a gravitational acceleration and Pa is a Pascal (unit of pressure)). Note that, the above equation is defined since: Pa is a Pascal indicating a unit of pressure and 1 MPa of the W/C pressure is equivalent to 0.1 G (gravitational acceleration) of deceleration.

Figure 2:
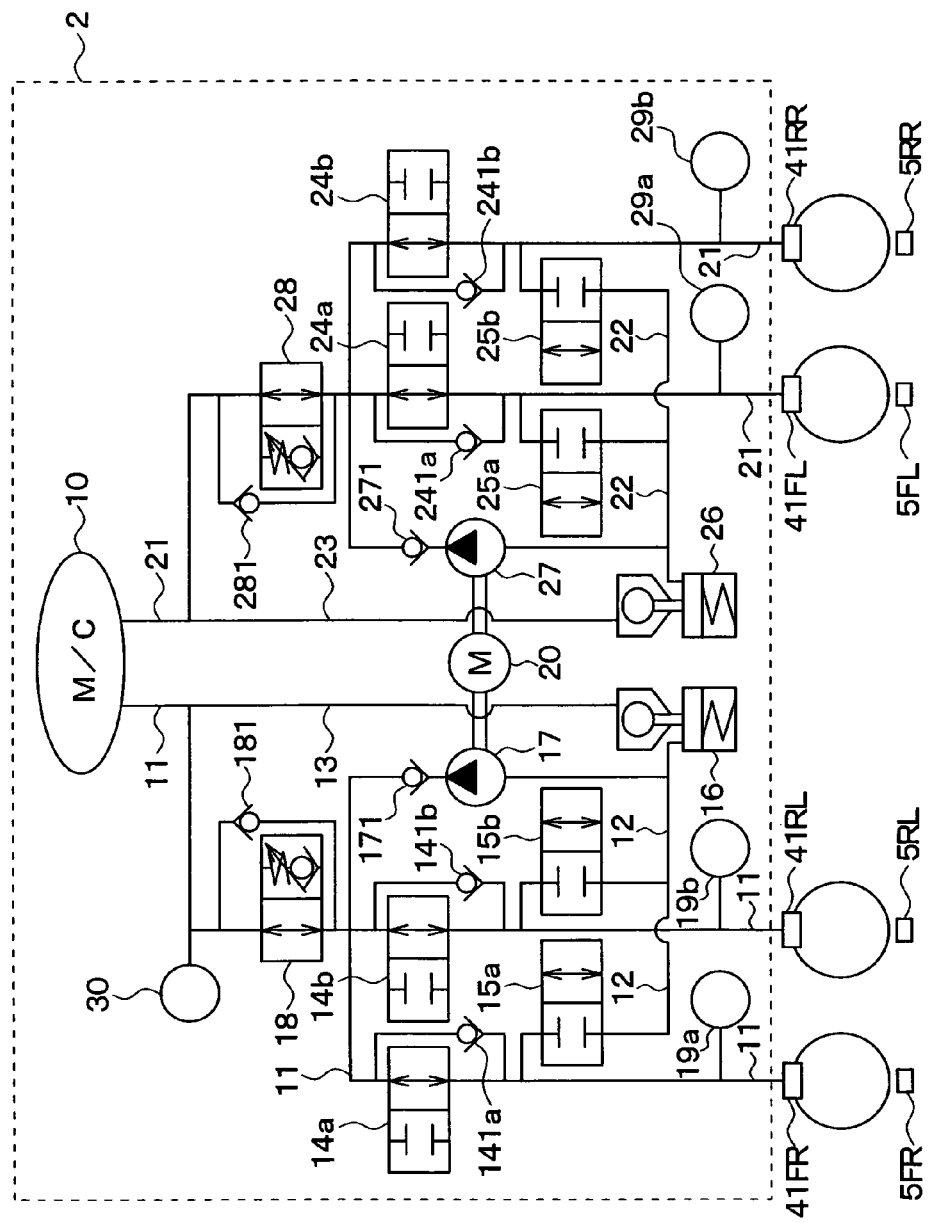
FIG. 2 shows the entire structure of a hydraulic brake device of the first embodiment.

The hydraulic brake device 2 is configured as shown in FIG. 2. When the vehicle driver depresses a brake pedal (not shown), a master cylinder (hereinafter referred to as "M/C") 10 produces an M/C pressure corresponding to a depression force. The M/C pressure is transmitted to W/Cs 41FR, 41RL, 41FL, and 41RR provided in the respective wheels 4FR, 4RL, 4FL and 4RR via the corresponding first brake circuit 21 and the second brake circuit 22, in order to generate a first braking force. Next, the first brake circuit 21 will be described with particular emphasis on the brake circuit related to the front right wheel 4FR. However, the same description applies to the other wheels 4FL, 4RR and 4RL of the first brake circuit 21 and the second brake circuit 22.

The first brake circuit 11 is provided with pressure increase control valves 14a and 14b that adjust pressure increasing and pressure maintenance for the respective W/Cs 41FR and 41RL in an anti skid control (hereinafter referred to as "ABS control") for the front right wheel 4FR and the rear left wheel 4RL, respectively. Further, the pressure increase control valves 14a and 14b are arranged in parallel with check valves 141a and 141b, respectively, in order to allow fluid flow to be directed toward the M/C 10 if the W/C pressure is excessive during the closure of each of the pressure increase control valves 14a and 14b. Pressure decrease control valves 15a and 15b are provided in a pressure decrease line 12 extending from a point between the pressure increase control valves 14a and 14b and the W/Cs 41FR and 41RL. These pressure decrease control valves 15a and 15b adjust pressure decrease and pressure maintenance of the W/Cs 41FR and 41RL in the ABS control.

The pressure decrease line 12 is connected to a reservoir 16. The reservoir 16 stores brake fluid and has a check valve for adjusting a brake fluid pressure therein. This brake fluid is sucked up by a pump 17 driven by a motor 20, and then discharged into the first brake circuit 21. The discharge destination is a point between the pressure increase control valves 14a and 14b and a master cut valve (hereinafter referred to as "SM valve") 18. The motor 20 also drives a pump 27 in the second brake circuit 22. Further, a check valve 171 is provided in the outlet of the pump 17.

The SM valve 18 is disposed between the M/C 10 and the pressure increase control valves 14a and 14b. The SM valve 18 is a two-position valve that is in a opened state when non-energized, and is in a closed state when energized, due to a check valve positioned in the direction shown in FIG. 2. In the closed state, the pressure in the W/Cs 41FR and 41RL is cancelled when it is higher than the pressure in the M/C 10 by the amount of a component of pressure caused by the spring of the check valve. Accordingly, a pressure release structure is realized. The SM valve 18 is arranged in parallel with a check valve 181, and as a result only flow from the M/C 10 toward the W/Cs 41FR and 41RL is permitted.

A suction line 13 establishes a connection between the reservoir 16 and a point between the M/C 10 and the SM valve 18.

An fluid pressure sensor 30 that detects pressure generated in the M/C 10 is provided between the M/C 10 and the SM valve 18 in the first brake circuit 21. The pressure detected by the fluid pressure sensor 30 is a pressure generated in a secondary chamber (not shown) of the M/C 10. It should be noted that the same pressure is produced in a primary chamber thereof, which is connected to the second brake circuit 22. Hence, the fluid pressure sensor 30 effectively detects the M/C pressure. Further, fluid pressure sensors 19*a* and 19*b* that detect each W/C pressure are respectively provided between the pressure increase control valve 14*a* and the W/C 41FR, and between the pressure increase control valve 14*b* and the W/C 41RL. The output signals from these fluid pressure sensors 30, 19*a* and 19*b* are input to the brake control ECU 1.

Each of the above pressure increase control valves 14*a* and 14*b*, and the pressure decrease control valves 15*a* and 15*b* is a two-position valve, which is in the valve position illustrated in FIG. 2 when non-energized (i.e., OFF), such as when the brake pedal is not applied, or during normal braking operation, or the like. In other words, when non-energized, the pressure increase control valves 14*a* and 14*b* are in the opened state and the pressure decrease control valves 15*a* and 15*b* are in the closed (cut-off) state. Further, during normal non-energized periods, the SM valve 18 is in the valve position illustrated in FIG. 2, namely, the opened state. Each of the above control valves is operated by an actuating signal supplied by the brake control ECU 1. Moreover, the motor 20 driving the pumps 17 and 27 is operated by a brake actuating signal supplied by the brake control ECU 1.

It should be noted that the individual actuating signals supplied from the brake control ECU 1 to the hydraulic brake device 2 correspond in aggregate to a first actuating signal. Further, placing the hydraulic brake device 2 into a control pause (or control prohibited) state indicates placing the first actuating signal in an inactive state, namely to zero (the non-actuating state). Specifically, in this control pause state, none of the pressure increase control valves 14*a* and 14*b*, the pressure decrease control valves 15*a* and 15*b* and the SM valve 18 (as well as pressure increase control valves 24*a* and 24*b*, pressure decrease control valves 25*a* and 25*b* and an SM valve 28 in the secondary brake circuit 22) are energized, and the driving current of the motor 20 becomes zero. Accordingly, when the first actuating signal becomes inactive, the W/C pressure for each wheel 4FR, 4FL, 4RR, and 4RL is decreased to zero and therefore the first braking force becomes zero.

Next, a description will be given of the braking operation carried out on the basis of each of the command values for pressure increasing, pressure maintenance and pressure decrease, which correspond to the first actuating signal supplied from the brake control ECU 1. This braking operation is carried out regardless of the automatic braking operation of the above hydraulic brake device 2, namely, regardless of whether the brake pedal is applied. Note that the operation based on brake pedal application by the driver which is the normal operation, and the operation in the ABS control are well known, and thus a description will be omitted here.

In the pressure increase processing in the automatic braking control, the SM valve 18 is switched to ON (the cut-off position) and further the pressure decrease control valve 15*a* is switched to OFF (the cut-off position). Then, the pump 17 is driven to draw up brake fluid and then discharge it via the reservoir 16. While the pump 17 generates the discharge pressure, a comparison with the value detected by the fluid pressure sensor 19*a* is performed, and at the same time the pressure increase control valve 14*a* undergoes ON/OFF duty ratio control. This causes a increase of the W/C pressure at a predetermined change gradient or to a preset target pressure. At this point, the brake fluid is refilled as required from the M/C 10 to the inlet of the pump 17, through the suction line 13 and the reservoir 16.

In the pressure decrease processing in the automatic braking control, the SM valve 18 is switched to ON (the cut-off position) and also the pressure increase control valve 14*a* is switched to ON (the cut-off position). Then, the pump 17 is driven to draw up brake fluid and then discharge it via the reservoir 16. While the pump 17 generates the discharge pressure, a comparison with the value detected by the fluid pressure sensor 19*a* is performed, and at the same time the pressure decrease control valve 15*a* by ON/OFF duty ratio control. Thereby, brake fluid is drawn from the W/C 41FR to decrease the W/C pressure at a predetermined variation gradient or to a preset target pressure.

At this point, due to both the pressure increase control valve 14*a* and the SM valve 18 being in the cut-off position, the discharge pressure of the pump 17 rises. When the rising pressure exceeds the elastic force of the spring in the check valve of the SM valve 18, the pressure is cancelled and pressure decrease takes place.

In the pressure-maintenance processing in the automatic braking control, the SM valve 18 is switched to ON (the cut-off position), and both the pressure increase control valve 14*a* and the pressure decrease control valve 15*b* are switched to the cut-off positions. Accordingly, the W/C pressure is maintained.

Next, the motor-operated PKB 3 serving as the second brake unit will be described.

When the vehicle VL is in a stopped state, the motor-operated PKB 3 maintains the stopped state. Specifically, the motor-operated PKB 3 is operated according to the second actuating signal from the brake control ECU 1. In the motor-operated PKB 3, an actuator including a motor and a gear mechanism (none of these elements are shown) drives each of the brake wires 31R and 31L, in order to press the brake caliper and a friction material in each of the wheels 4RR and 4RL against the corresponding brake disc (not shown) so as to generate a braking force.

The motor of the motor-operated PKB 3 is duty controlled based on the control of the second actuating signal so as to rotate in the normal direction (increase in braking force), or in the opposite direction (decrease in braking force), thereby allowing control of the magnitude of a second braking force.

At this point, the braking force is generated in accordance with the duty ratio. When this braking force reaches the target braking force, the motor of the motor-operated PKB 3 is locked. When locking of the motor is detected, the driving current for the motor is interrupted, namely the second actuating signal becomes inactive, so as to bring the motor-operated PKB 3 into the control pause (control prohibited) state. When the motor-operated PKB 3 is in the control pause state, the gear mechanism does not operate. Accordingly, the braking force is maintained, and a locked state of the wheels 4RR and 4RL is maintained.

Such operation of the motor-operated PKB 3 is executed in accordance with the second actuating signal supplied from the brake control ECU 1 during automatic brake control. Alternatively, the motor-operated PKB 3 may be operated such that when the driver switches a parking brake switch (not shown) to ON or OFF, the brake control ECU 1 outputs the second actuating signal for the motor-operated PKB 3 in response to this signal.

As illustrated in FIG. 2, the wheel speed sensors 5 includes the wheel speed sensors 5FR, 5FL, 5RR, and 5RL for detecting the rotational speed of respective wheels 4FR, 4FL, 4RR and 4RL. Output signals from the sensors 5FR, 5FL, 5RR and 5RL are input directly to the brake control ECU 1.

It should be noted that a semiconductor speed sensor using a Hall element is employed for each of the wheel speed sensors 5FR, 5FL, 5RR and 5RL. Hence, even when travelling at low speeds, a pulse signal is obtained that reliably indicates the vehicle wheel rotational speed and rotation direction. This makes it possible to detect a precise vehicle wheel speed even when the vehicle is caused to move from the stopped state to a moving state.

The sensor cluster 50 is provided with a brake operation amount sensor 51, an accelerator operation amount sensor 52, a shift position sensor 53, a vehicle-surround monitoring sensor 54, a gradient sensor 53, and a vehicle stop maintenance start switch 56.

The brake operation amount sensor 51 detects an operation amount of the brake pedal. The accelerator pedal operation amount sensor 52 detects an operation amount of an accelerator pedal (not shown), namely, an accelerator opening.

The shift position sensor 53 detects shift position information in accordance with a shift position state. Here, the shift position state refers to the shift position of the AT 90, such as D (drive), 2 (second), L (low), R (reverse), N (neutral) and P (parking). These shift positions are selected by the operation of a gearshift lever by the driver. If the shift position sensor 53 detects the D range (or the 2 range or the L range) it can be determined that the driver's intended movement direction is forward, whereas, if the R range is detected it can be determined that the driver's intended movement direction is backward.

The vehicle-surround monitoring sensor 54 is provided at a front portion or a back portion of the vehicle VL, for example, in a bumper, and uses a laser radar to measure a distance x from the vehicle VL to an obstacle that exists in front of or behind the vehicle VL. The gradient sensor 55 detects an angle of the vehicle body with respect to a horizontal plane, namely, an upward gradient or a downward gradient. The vehicle stop maintenance start switch 56 is operated by the driver and generates a signal for starting vehicle stop maintenance control.

Further, the sensor output of the shift position sensor 53 is directly input to the AT-ECU 9. The other ECUs may obtain the shift position information from the AT-ECU 9 via the on-board LAN bus 6. Moreover, it is possible for the upward gradient and the downward gradient to be estimated by calculation by the brake control ECU 1 using a known method (e.g., that disclosed in Japanese Patent Laid-Open Publication No. 06-264783), instead of by using the gradient sensor 55.

Known devices may be used for each of the aforementioned sensors, and thus a detailed explanation will be omitted here.

The starting assistance control ECU 7 is configured from a computer and receives the shift position information from the shift position sensor 53, actual gear position information from the AT-ECU 9, and so on. The starting assistance control ECU 7 executes processing in accordance with a procedure shown in a flow chart that will be described later. Accordingly, the starting assistance control ECU 7 calculates a required engine control amount and a required brake control amount and determines a downshift requirement for causing the vehicle VL to drive in a creep driving mode, and outputs the amounts and the requirement to the engine control ECU 8, the brake control ECU 1, and the AT-ECU 9, respectively. Thus, the starting assistance control ECU 7 corresponds to a drive acceleration intention unit, a stop maintenance intention unit, a target creep setting unit, a vehicle speed acceleration unit, a vehicle speed deceleration unit, and a starting assistance control unit according to the invention.

The engine control ECU 8 is configured from a computer. The engine control ECU 8 executes engine output control by adjustment of an engine fuel injection amount and an injection time, based upon the engine control amount calculated in accordance with the depression amount of the accelerator pedal caused by an ordinary driver, namely, the accelerator opening, and also upon the engine control amount calculated by the starting assistance control ECU 7. Here, the engine control amount refers to a required throttle opening. The engine control ECU 8 corresponds to an engine output control unit according to the invention.

The AT-ECU 9 is configured from a computer. As with normal transmission control, the AT-ECU 9 determines a shift gear ratio in accordance with a predetermined shift pattern map that is based on the shift position information from the shift position sensor 53, the accelerator opening detected by the accelerator operation amount sensor 52, and the calculated speed, and then executes shifting. Moreover, according to this embodiment, when the downshift requirement is output from the starting assistance control ECU 7, downshift is executed that interrupts the automatic transmission control. Moreover, the AT-ECU 9 transmits the actual gear position information to the starting assistance control ECU 7. It should be noted that the actual gear position information and the shift position information from the shift position sensor 53 are essential for determining whether to downshift.

Next, an operation procedure of the creep drive control device according to the first embodiment will be explained based on the main flow chart shown in FIG. 3.

This main flow chart is executed by the starting assistance control ECU 7 and the brake control ECU 1. The starting assistance control ECU 7 and the brake control ECU 1 operate cooperatively in an integrated form so as to execute each processing. It goes without saying that the processing in the flow chart can be executed with the starting assistance control ECU 7 and the brake control ECU 1 adopting completely separate forms, or alternatively, with the starting assistance control ECU 7 integrated with an ECU other than the brake control ECU 1.

Each processing shown in the flow chart is initiated when the ignition is turned on, and is repeatedly executed with a predetermined control cycle (for example, 5 to 10 ms).

At 100, an initial check is executed. At this point, the brake control ECU 1 executes an operation check of each actuator of the hydraulic brake device 2 and the motor-driven PKB 3.

More specifically, a disconnection check is executed by actually energizing each electromagnetic valve of the hydraulic brake device 2 and executing a check of the terminal voltages of each electromagnetic valve of the brake control ECU 1. Moreover, a failure location identification is executed by determining whether there are any hydraulic pressure abnormalities based on the detection values of the fluid pressure sensors 30, 19a and 19b, and fluid pressure sensors 29a and 29b.

Moreover, failure location identification is executed by determining whether a detected current is normal when the motor-driven PKB 3 is actually energized, and whether the motor of the motor-driven PKB 3 rotates normally, and the like. In the case that a failure is detected, the system is configured such that, following failure diagnosis in the motor-driven PKB 3, control is prohibited, an alternate control is switched to, and a warning lamp is lit. Thus, it is possible to prevent a fatal failure from occurring such as abnormal operation of any portion of the brake device, and the like, from occurring. Along with this, the starting assistance control ECU 7 can suspend starting assistance control and switch to an alternative control, based on the respective failure diagnosis results of the brake control ECU 1, the engine control ECU 8, and the AT-ECU 9.

At 110, an input processing is executed in which detection data from each sensor are input.

At 120 and 130, respectively, the starting assistance control ECU 7 determines whether the driver has an acceleration intention and whether the driver has a stop maintenance intention (throughout this specification the term "stop maintenance intention" refers to the intention to stop a vehicle and maintain the stopped state of the vehicle thus achieved, as well as an intention to maintain a stopped state of the vehicle), based on a flow chart (shown in FIGS. 4 and 5), to be described later. When it is determined that the driver has the acceleration intention, or when it is determined that the driver has the stop maintenance intention, there is no necessity to execute the starting assistance control. Accordingly, it is determined whether either of these cases applies in the given situation.

At 140, the brake control ECU 1 calculates the brake control amount and the engine control amount that accord with the braking force requirement for the ABS control, the VSC control and the TCS control.

At 150, the starting assistance control is executed based on a flow chart described hereinafter (refer to FIG. 6). This processing is executed by the starting assistance control ECU 7 and includes executing a vehicle speed acceleration control and/or a vehicle speed deceleration control such that, for example, an actual vehicle speed becomes equal to a target creep vehicle speed. In other words, the engine control amount and the brake control amount are calculated so as to control the engine output and the braking force in order to execute these controls. Moreover, when it is determined that the driver's intention has switched to either the acceleration intention or the stop maintenance intention at 120 and 130, the vehicle acceleration control and the vehicle deceleration control are terminated. Then, bridge control is executed such that the engine control amount and the brake control amount converge on and eventually equal values that accord with an operation amount of the driver.

Processing at 160 is executed by the brake control ECU 1. At 160, a brake control adjustment control is executed in which the brake control amount corresponding to the braking force requirement calculated at 140 is compared to the brake control amount corresponding to the braking force requirement calculated at 150, and a brake control amount is selected that corresponds to the largest of these braking force requirements. Then, target braking forces for the hydraulic brake device 2 and the motor-driven PKB 3, respectively, are determined in accordance with the braking force requirement selected in the brake control adjustment.

At 170, a fail safe check when the ignition is ON is executed. Namely, a normal diagnosis test of the status of the brake control ECU 1, the hydraulic brake device 2, the motor-driven PKB 3, the starting assistance control ECU 7, the engine control ECU 8, the AT-ECU 9, and the various other sensors, is executed. In the case that a failure is detected, predetermined processing is executed so that the vehicle VL can be driven safely or stopped, even if the portion detected to have a failure is not functioning.

At 180, the brake control ECU 1 controls the first actuating signal such that the first braking force of the hydraulic brake device 2 that is generated in accordance with the first actuating signal becomes equal to the target braking force set at 160.

At 190, the brake control ECU 1 controls the second actuating signal such that the second braking force of the motor-driven PKB 3 that is generated in accordance with the second actuating signal becomes equal to the target braking force set at 160.

At 195 the engine control amount for the VSC control and the TCS control calculated at 140 by the brake control ECU 1, and the engine control amount for the starting assistance control calculated at 150 by the starting assistance control ECU 7 are transmitted to the engine control ECU 8 from the brake control ECU 1. Based on these engine control amounts, various types of engine control signal are output to the engine control ECU 8.

Figure 4:
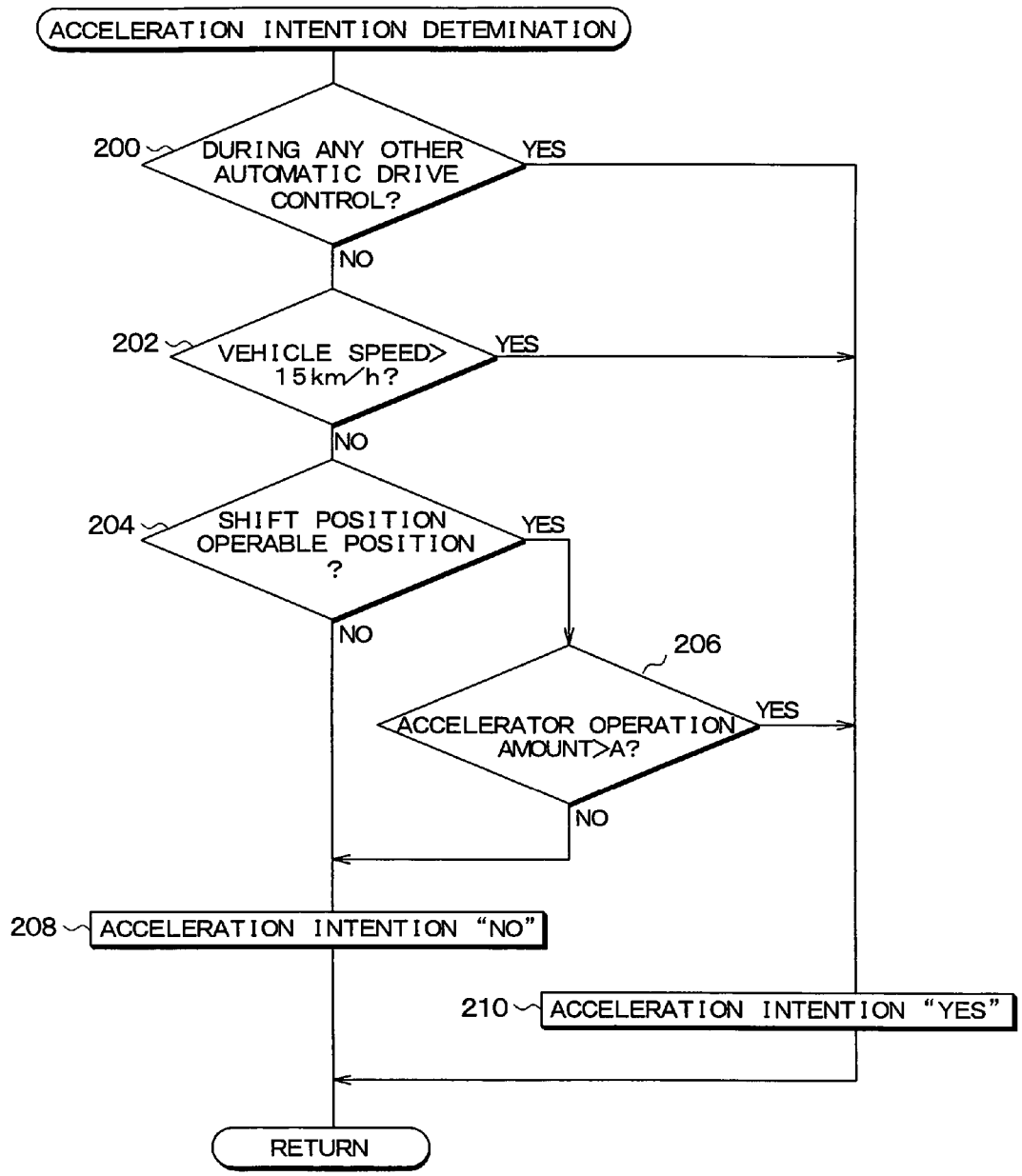
FIG. 4 is a flow chart showing a procedure of an acceleration intention determination of the first embodiment.

Next, the flow of the acceleration intention determination of aforementioned processing at 120 will be described with reference to FIG. 4.

At 202, it is checked whether any other automatic drive controls are being executed. Such other automatic drive controls are, for example, congestion adaptive cruise control of a congestion adaptive cruise control ECU (not shown); in this control, when the distance between the vehicle VL and a vehicle in front becomes equal to a predetermined value or less, braking force is automatically generated in order to prevent a collision with the vehicle in front. In the check at 200, it is determined that another automatic drive control is being executed when a control, such as this congestion adaptive cruise control, is being executed. When the result is YES, it is determined that the driver has the acceleration intention, and the routine proceeds to 210. When the result is NO, the routine proceeds to 202.

At 200, it is determined whether the vehicle speed is equal to a predetermined value or more, for example, whether the vehicle speed is equal to or more than 15 km/h, which is slightly faster than a reference creep vehicle speed. If the result is YES, it is determined that the driver has the acceleration intention. If the result is NO, the routine proceeds to 204.

At 204, it is determined if the shift position is a drive operable position, namely, is one of the D, 2, L and R positions. If the result is NO, namely, the shift position is P or N, it is determined that the driver does not have the acceleration intention and the routine proceeds to 208. If the result is YES, the routine proceeds to 206.

At 206, if an accelerator operation amount is equal to a predetermined value A or more, it is determined that the driver has the acceleration intention. If this is not the case, it is determined that the driver does not have the acceleration intention.

At this point, it is determined that the driver does not have the acceleration intention when no other automatic drive controls are being executed, the vehicle speed is equal to 15 km/h or less, and the shift position is the P or N position. Alternatively, it may be determined that the driver does not have the acceleration intention when no other automatic drive controls are being executed, the vehicle speed is equal to 15 km/h or less, the shift position is one of the D, 2, L and R positions, and the accelerator operation amount is equal to the predetermined amount A or less.

Figure 3:
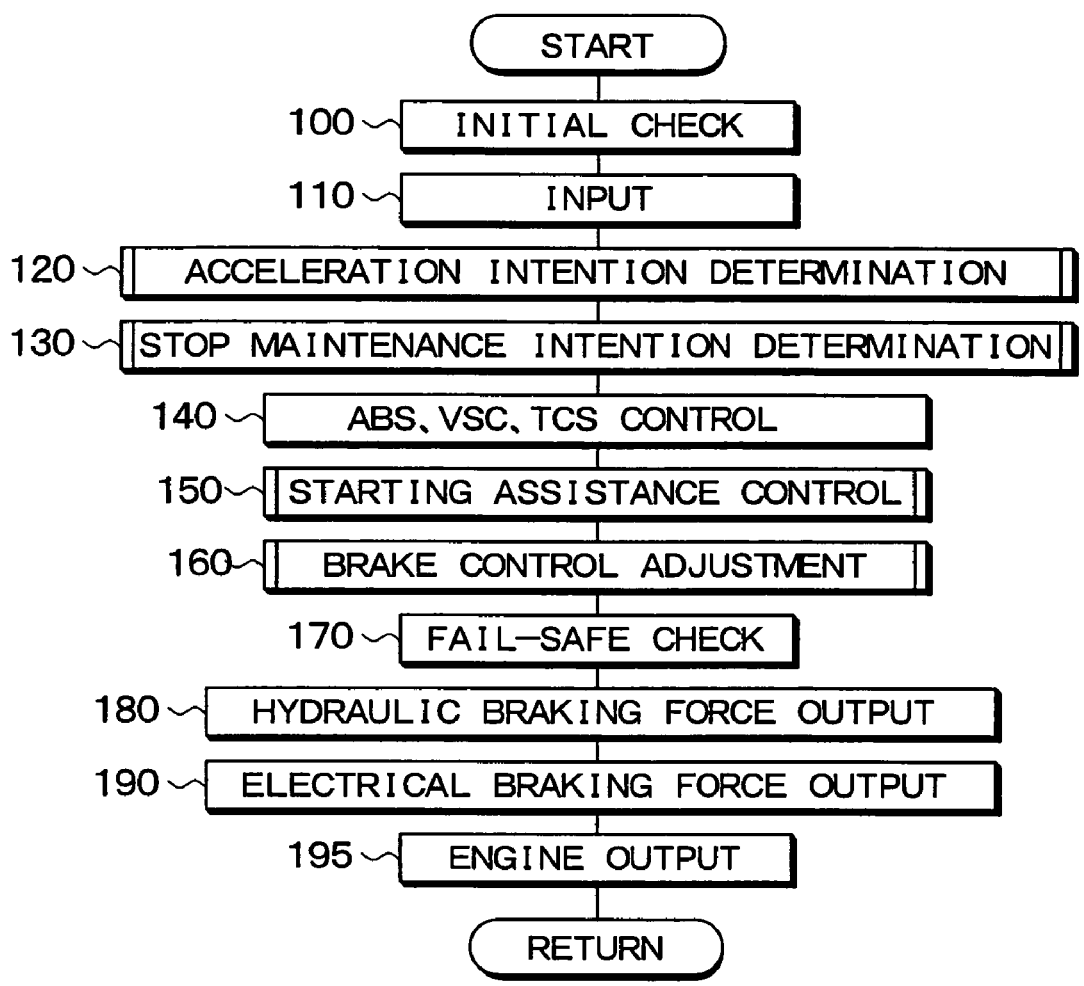
FIG. 3 is a main flow chart showing a procedure of a creep drive control device of the first embodiment and a second embodiment according to the present invention.
Figure 5:
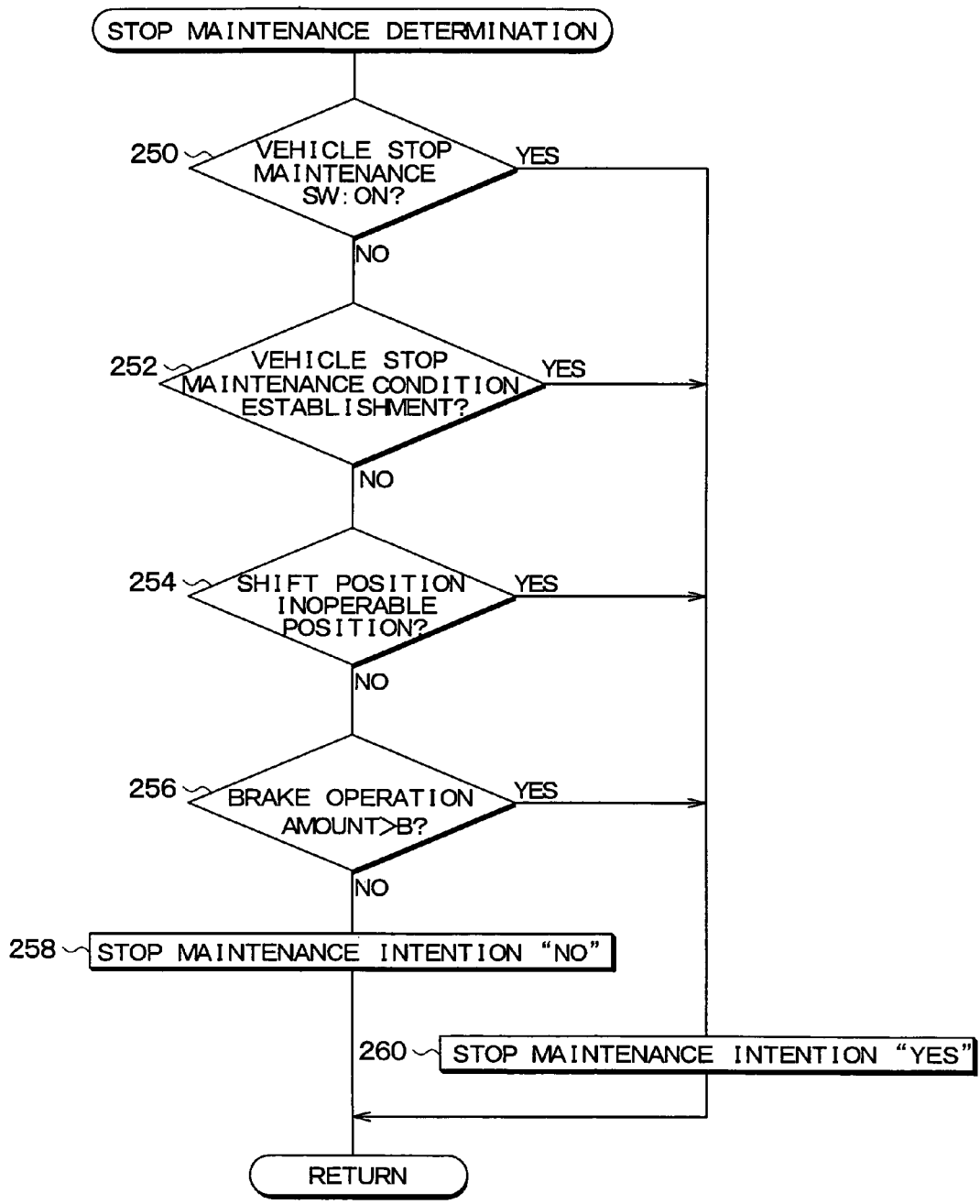
FIG. 5 is a flow chart showing a procedure of a stop continuation intention determination of the first embodiment.

On the other hand, the stop maintenance determination of processing at 130 shown in FIG. 3 is executed in accordance with the flow chart shown in FIG. 5.

First, at 250, it is determined whether the vehicle stop maintenance start switch 56 is on. If the vehicle stop maintenance start switch 56 has been switched to ON, it is determined that the driver has the stop maintenance intention at 260. If the vehicle stop maintenance start switch 56 has not been switched to ON, the routine proceeds to 252.

At 252 it is determined whether a vehicle stop maintenance condition has been established. More particularly, for example, the condition may be set as whether a stopped state (vehicle speed equals zero) has been maintained for 5 sec. or longer. If the result is YES, it is determined that the driver has the stop maintenance intention, whereas, if the result is NO, the routine proceeds to 254.

At 254, it is determined whether the shift position is a drive inoperable position, namely, the P or N positions. If the result is YES, it is determined that the driver has the stop maintenance intention. If the result is NO, namely the shift position is one of the D, 2, L or R positions, the routine proceeds to 256.

At 256, it is determined whether a brake operation amount has exceeded a predetermined value B. If the result is YES, it is determined that the driver has the stop maintenance intention. If the result is NO, it is determined that the driver does not have the stop maintenance intention and the routine proceeds to 258.

If, up to this point, it has been determined that the driver does not have the stop maintenance intention, it is because the vehicle stop maintenance switch 56 has not been switched to ON, the stop maintenance condition (in this case, whether stop maintenance has been continued for 5 sec. or longer) has not been satisfied, and the shift position is one that makes drive inoperable, and the brake operation amount is equal to the predetermined value B or less.

Next, the starting assistance control of processing at 160 shown in FIG. 3 will be explained with reference to the flow chart shown in FIG. 6.

At 300 it is checked whether the driver has the acceleration intention based on the determination result of processing at 120. If the result of processing at 300 is YES, namely, if the driver has the acceleration intention, the routine proceeds to the bridge control of processing at 314. If the result is NO, namely, if the driver does not have the acceleration intention, the routine proceeds to 302.

At 302, it is checked whether the driver has the stop maintenance intention based on the determination result from 130. If the result of processing at 302 is YES, namely, the driver has the stop maintenance intention, the routine proceeds to the bridge control at 314. If the result is NO, namely, the driver does not have the stop maintenance intention, the routine proceeds to 304.

At 304, a starting assistance control in-progress flag is set that indicates that the starting assistance control is being executed. Along with this, a target creep vehicle speed α is set in accordance with a procedure described hereinafter (refer to FIG. 7).

Figure 10:
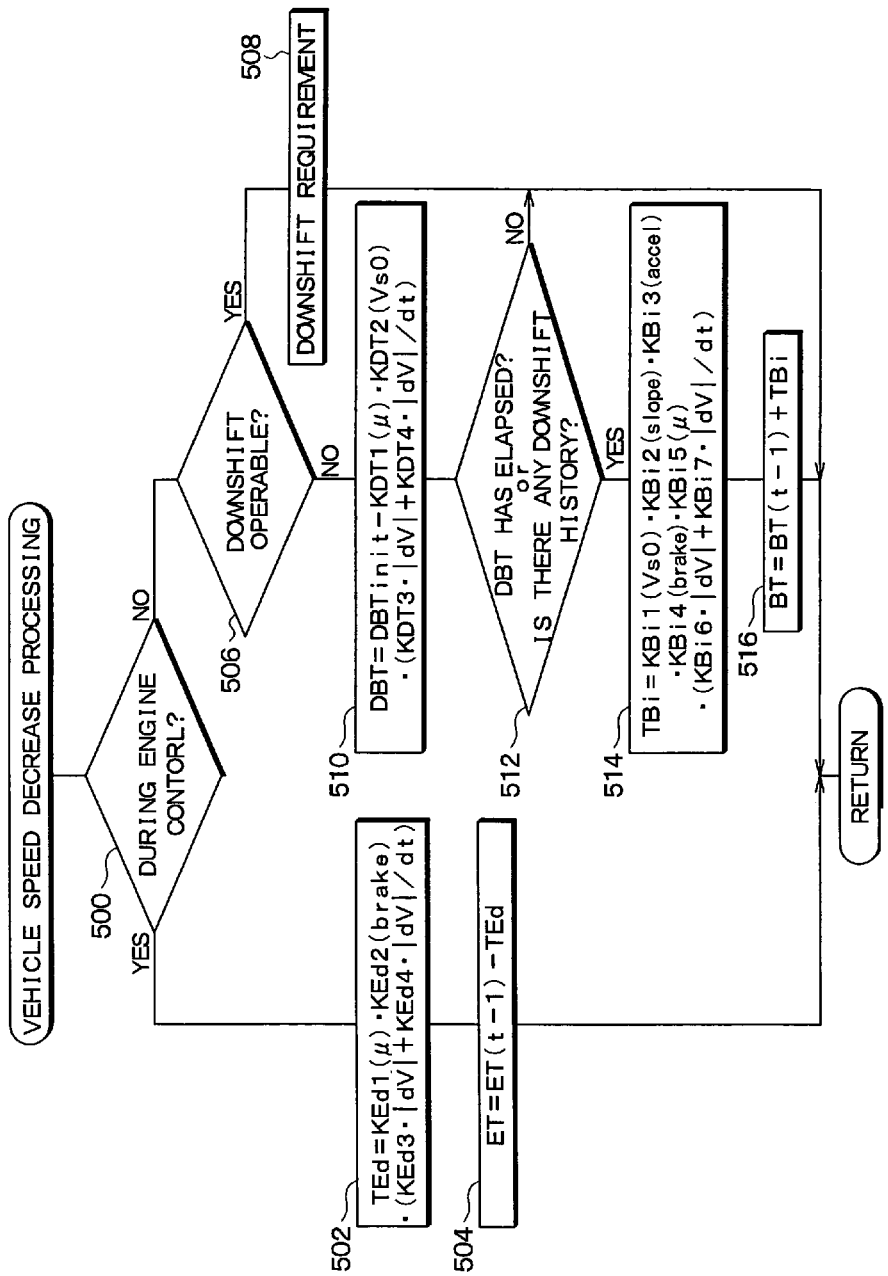
FIG. 10 is a flow chart showing a procedure of a vehicle speed deceleration processing of the first embodiment.

At 306, it is determined whether the actual vehicle speed is greater than the target creep vehicle speed α. More accurately speaking, a dead zone β for stabilizing control is set, and it is determined whether the actual vehicle speed is larger than a second target vehicle speed which is equal to α+β. If the result is YES, the routine proceeds to 310, and a vehicle speed deceleration processing shown in FIG. 10 is executed. If the result is NO, the routine proceeds to 308.

Figure 12:
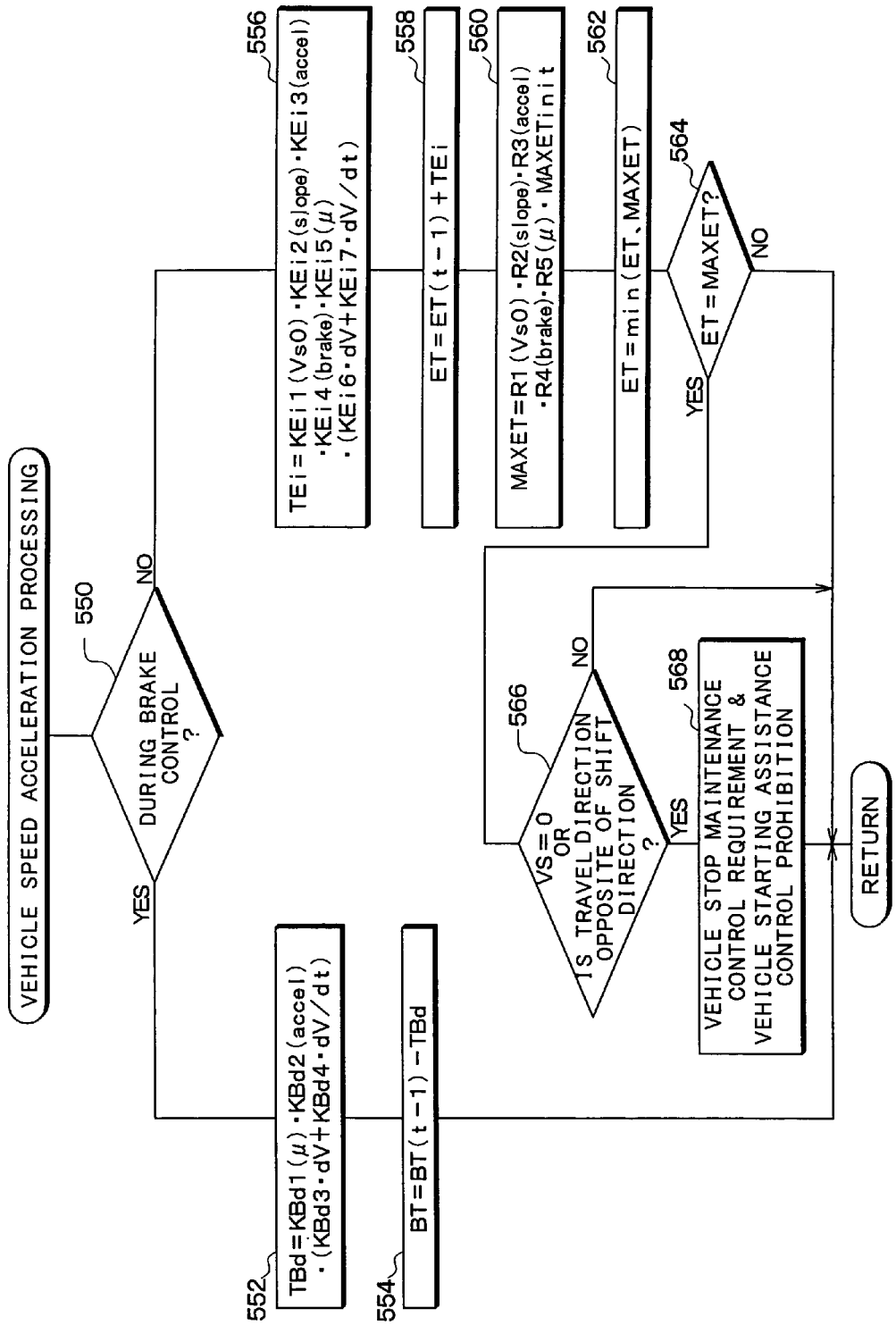
FIG. 12 is a flow chart showing a procedure for a vehicle speed acceleration processing of the first embodiment.

At 308, it is determined whether the actual vehicle speed is lower than a first target vehicle speed that is α−β. Yes, the routine proceeds to 312, and a vehicle speed acceleration processing shown in FIG. 12 is executed. If the result is NO, it is inferred that the vehicle speed is within a fixed range (α−β≦ actual vehicle speed ≦α+β), and the starting auxiliary control is terminated.

Next, the flow of the routine for setting the target creep vehicle speed α at 304 will be explained.

First, in processing from 400 to 410, the reference creep vehicle speed that is pre-set is corrected in accordance with the driving conditions, the road surface conditions and driver operations. In order to do so, first, correction coefficients K1 to K6 for deriving the target creep vehicle speed α are calculated based on the map shown in FIGS. 8A to 8F.

Correction coefficient K1 is set so as to increase from 1 in accordance with the magnitude of the accelerator opening caused by the driver.

Correction coefficient K2 is set so as to decrease from 1 in accordance with the magnitude of the brake operation amount of the driver.

Correction coefficient K3 is set to a value that accords with the vehicle travel direction determined based on the vehicle speed signal; the value of correction coefficient K3 is set at 1, and is not corrected when the vehicle moves forward (i.e., the value remains at 1) and becomes smaller than 1 when the vehicle moves backward.

Correction coefficient K4 is based upon sensor information of the gradient sensor 55, and is set so as to decrease from 1 in accordance with increase in a gradient of an upward sloping gradient, and increase from 1 in accordance with decrease in a gradient of a downward gradient.

Correction coefficient K5 is set in accordance with the distance x that is detected by the vehicle-surround monitor sensor 54 between the vehicle VL and the obstacle that exists in the vehicle's travel direction. Correction coefficient K5 is set so as to increase toward 1 from a value smaller than 1 as the distance between the vehicle and the obstacle becomes larger.

Correction coefficient K6 is set in accordance with a continuation time T that indicates how long a state has continued in which braking force is equal to a predetermined value or above. Correction coefficient K6 is set so as to increase from 1 as the continuation time T becomes longer.

At 412, the multiple of the above calculated correction coefficients K1 to K6 and the pre-set reference creep vehicle speed is set as the target creep vehicle speed α. Accordingly, the reference creep vehicle speed is corrected upward or downward in accordance with each correction coefficient K1 to K6, and the target creep vehicle speed α is derived.

At 414, a speed limiting processing for limiting the above calculated target creep vehicle speed α such that it is within a predetermined value range. In other words, as shown by the speed limiting characteristics in FIG. 9, the target creep vehicle speed α is limited such that during creep driving the vehicle speed cannot become excessive; for example, an upper limit value of 10 km/h may be set.

Figure 9:
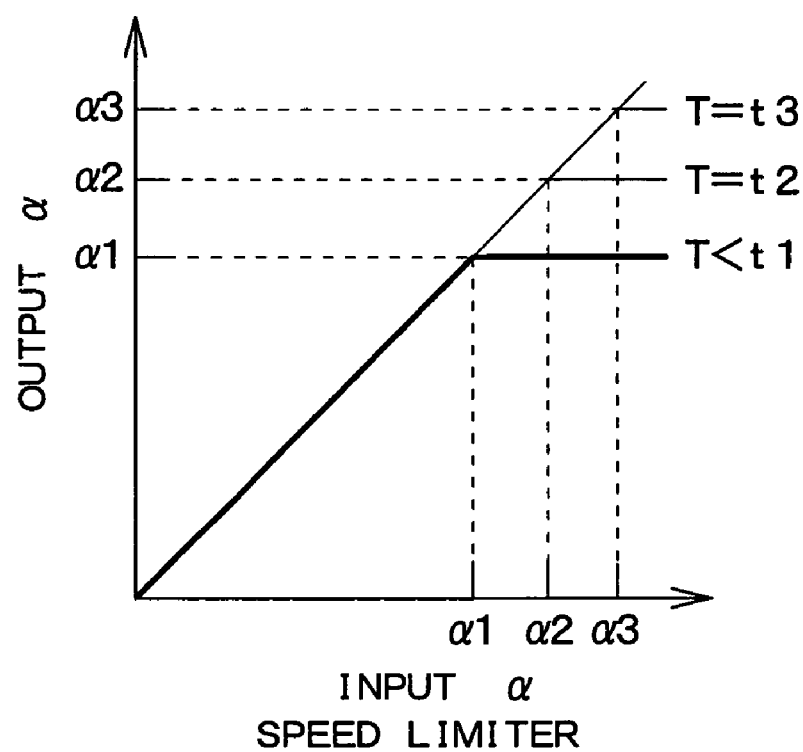
FIG. 9 is a diagram that shows input-output characteristics of a vehicle speed limiting processing.

Further, in this speed limiting processing, the upper limit value of the target creep vehicle speed a is set to become larger in accordance with lengthening of the continuation time T of the state in which braking force is equal to or above the predetermined value, namely, the creep control continuation time T. FIG. 9 shows an example of determination of limit values of the target creep vehicle speed α. More particularly, when the continuation time T<t1, the target creep vehicle speed α is limited to α1 even if the calculated target creep vehicle speed α is above 1. When t1≦T≦t2, the target creep vehicle speed α is limited to α2 (>α1) even if the calculated target creep vehicle speed α is above α2. Further, when t2<T≦t3, the target creep vehicle speed α is limited to α3 (>α2) even if the calculated target creep vehicle speed α is above α3. Accordingly, the speed limiting processing makes it possible, for example, to increase the target value and decrease the braking force so as to inhibit generation of damage resulting from, for example, heat discharged by brake rotors due to applying for a long period the braking force necessary to maintain the target creep vehicle speed α on a long downward slope.

As a result of the processing of the previously described processing up to processing at 414, the corrected target creep vehicle speed α is determined in accordance with the driving conditions, the road surface conditions, and driving operations.

Next, in at 416, a speed deviation dV of the target creep vehicle speed α and the actual vehicle speed Vs0 is calculated (dV=α−Vs0). Further, a gradient (a differential value) of this speed deviation dV is also calculated (dV/dt). The speed deviation gradient is calculated according to Equation (1) below:

$$dV/dt=(dV(t)-dV(t-1))/\Delta t \quad (1)$$

where, Δt is a control period (e.g., 5 ms); dV (t) is a speed deviation of this calculation period; and dV (t−1) is a speed deviation of a prior calculation period.

At 418, it is determined whether the absolute value |dV| of the speed deviation dV has exceeded a pre-set hysteresis value S. If the hysteresis value S has not been exceeded, the routine is terminated since it is assumed that even if the target creep vehicle speed α is set, there will be no sudden vehicle speed change. If the hysteresis value S has been exceeded, the routine proceeds to 420.

At 420, if the speed deviation is large, the target creep vehicle speed α is changed to a value that is the sum of the actual vehicle speed Vs0 and a predetermined value Z, rather than being set to the calculated value of processing at 414. Following this, the routine is terminated. Here, the predetermined value Z, as shown by Equation (2), is a value calculated as the linear sum (X and Y are coefficients) of the speed deviation dV and the speed deviation gradient.

$$Z=X \cdot dV+Y \cdot dV/dt \quad (2)$$

Accordingly, when the speed deviation is large, the vehicle speed is gradually changed in each control cycle using the value that is the sum of the actual vehicle speed and the predetermined value Z to renew the new target vehicle speed value. Accordingly, sudden changes in the vehicle speed are prevented.

Figure 6:
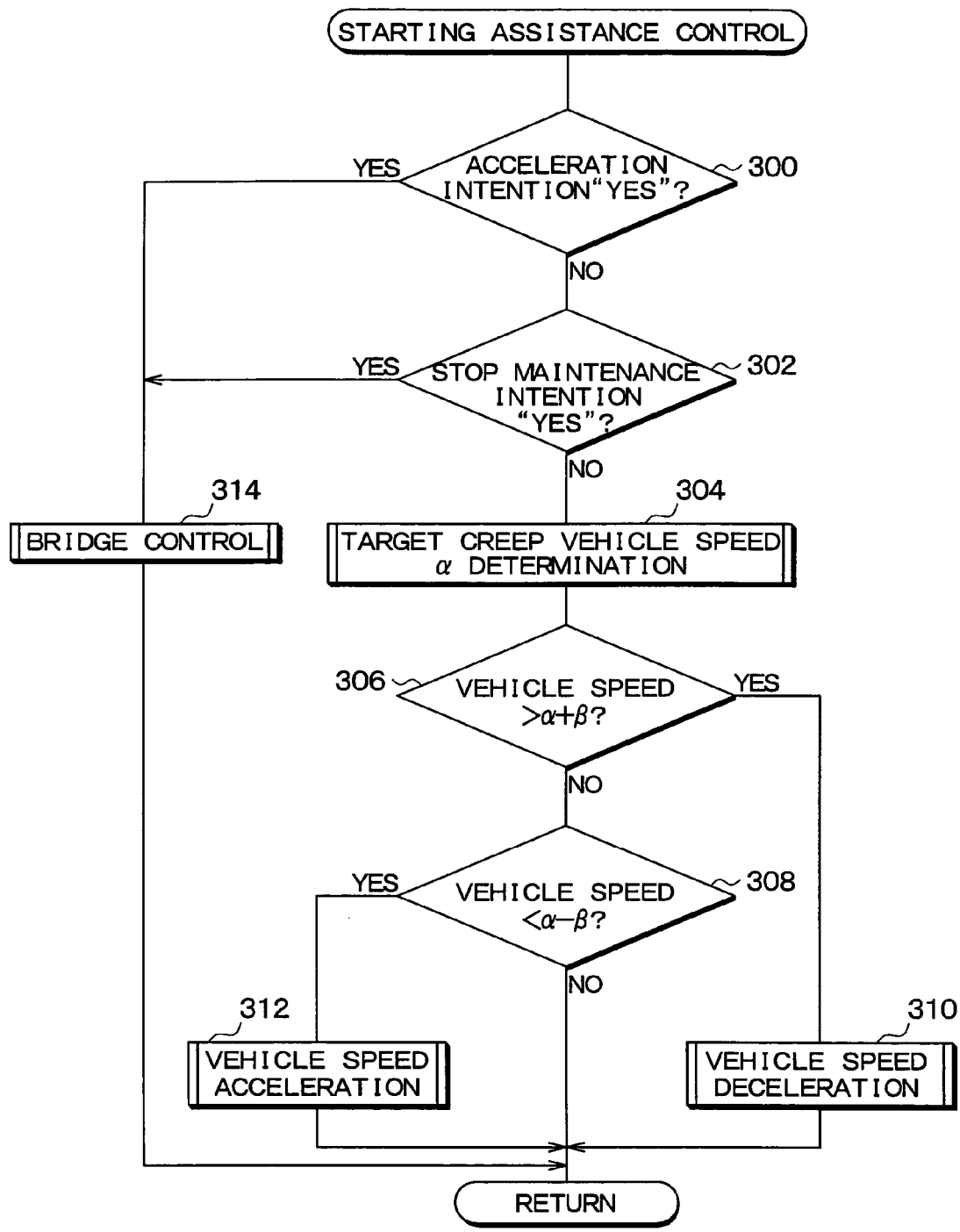
FIG. 6 is a flow chart showing a procedure of a starting assistance control of the first embodiment.

FIG. 10 shows the flow of the vehicle speed deceleration processing executed at 310 (refer to FIG. 6). The portion of the brake control ECU 1 that executes this vehicle speed deceleration processing flow corresponds to the vehicle speed deceleration unit according to the invention.

At 500, it is determined whether engine control that is not directly related to accelerator operation is being executed, namely, whether engine control of the starting assistance control, or engine control of the VSC control and TCS control is being executed. This determination is executed in order to make sure that, first, the vehicle speed deceleration of engine control is given priority in execution; when this engine control is completed, downshifting and brake control amount increase processing of the vehicle speed deceleration processing are executed. If engine control is being executed the routine proceeds to 502, whereas, if engine control is not being executed, the routine proceeds to 506.

Figure 11A:
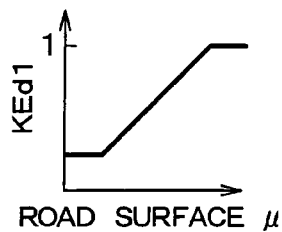
FIG. 11A to 11I are line diagrams that indicate characteristics of correction coefficients KEd1 and KEd2 of an engine decrease amount, correction coefficients KDT1 and KDT2 of a brake control initiation delay time; and correction coefficients KBi1 to KBi5 of a brake control increase amount.
Figure 11B:
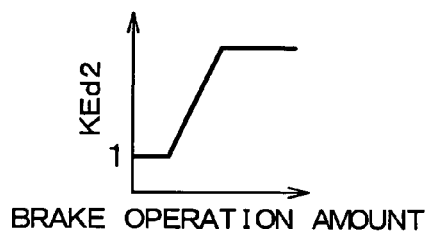

At 502, an engine decrease amount TEd for decreasing engine output for each control period is calculated based on Equation (3) in which the linear sum of the absolute value |dV| of the speed deviation dV (dV=α−Vs0) and the speed deviation gradient |dV|/dt is corrected using the road surface μ (road surface coefficient of friction) and the brake operation amount.

$$TEd=KEd1(\mu) \cdot KEd2(\text{brake}) \cdot (KEd3 \cdot |dV|+KEd4 \cdot |dV|/dt) \quad (3)$$

where, KEd1, as shown in FIG. 11(A), is a coefficient set to decrease from 1 in accordance with decrease of the road surface μ; in other words, the coefficient KEd1 is set such that, when the road surface μ is low, the engine decrease amount becomes smaller in order to minimize the impact on vehicle behavior caused by engine brake (e.g., inclination of the vehicle body in the forward or backward directions): and KEd2, as shown in FIG. 11(B), is a coefficient that is set to increase from 1 in accordance with increase of the brake operation amount; in other words, the coefficient KEd2 is set such that, when the operation amount of the brake pedal is large, the engine decrease amount becomes larger since it is necessary to rapidly cancel the engine control. Further, KEd3 and KEd4 are pre-set proportionality coefficients.

At 504, the engine decrease amount TEd determined as described above is taken as an output decrease gradient, and a new engine control amount ET is set which is a value equal to a prior period engine control amount ET (t−1) minus the engine decrease amount TEd. Then, the routine is exited.

On the other hand, when it is determined at 500 that engine control is not in-progress, at 506, it is determined whether downshift for decelerating the vehicle is possible based on the gear position information. This gear position information indicates the transmission gear actually selected by the AT 90 when the shift position is set to the D position. The gear position of the AT 90 is normally selected from one of a 1st speed to a 3rd speed even when the vehicle is moving at a low speed equivalent to a creep speed. Accordingly, if the gear position is the 2nd speed or above, it is determined that downshift is possible, and a downshift requirement flag is set at 508. Based on this flag information, the downshift requirement is transmitted to the AT-ECU 9.

In the case that the gear position is the 1st speed, downshift is not possible and thus the routine proceeds to 510.

Figure 11C:
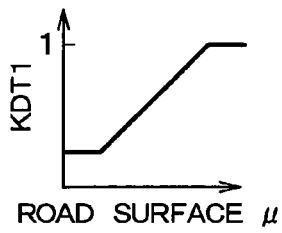
Figure 11D:
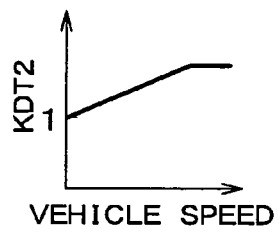

At 510, a delay time DBT for initiating brake control once a predetermined time period has elapsed is assigned by deducting a value that is proportional to the absolute value |dV| of the speed deviation dV and the speed deviation gradient |dV|/dt from a reference value $DBT_{init}$. This is conducted because it is necessary to execute deceleration rapidly in the case that the speed deviation dV and the speed deviation gradient are large. More specifically, the delay time DBT is set based upon Equation (4) below:

$$DBT=DBT_{init}-KDT1(\mu) \cdot KDT2(Vso) \cdot (KDT3 \cdot |dV|+KDT4 \cdot |dV|/dt) \quad (4)$$

where, KDT1, as shown in FIG. 11(C), is a coefficient set to decrease from 1 in accordance with decrease of the road surface μ; in other words, the coefficient KDT1 is set such that, when the road surface μ is low, the engine decrease amount based on the reference value $DBT_{init}$ becomes smaller in order to inhibit the vehicle behavior from becoming unstable due to braking: and KDT2, as shown in FIG. 11(D), is a coefficient that is set to increase from 1 in accordance with increase of the vehicle speed; in other words, when the vehicle speed is high, it is desirable to decelerate in a rapid manner, and thus the coefficient KDT2 is set such that the engine decrease amount based on the reference value $DBT_{init}$ becomes larger. Further, KEd3 and KEd4 are pre-set proportionality coefficients.

Next, at 512, it is determined whether the delay time DBT has elapsed since it was determined that a state in which downshift is impossible came into existence following a state in which downshift was possible, based on the determination of processing at 506. Alternatively, at 512, it may be determined whether there has been any history of downshift.

The downshift history is determined based on whether there is any history of the downshift requirement flag being set. More particularly, as shown in FIG. 6, it is determined whether a downshift requirement has been output following transition to vehicle speed deceleration control from processing that had previously been selected that was different to the vehicle speed deceleration processing (namely, when one of the vehicle speed acceleration processing (processing at S312), the bridge control processing (processing at S314), and no specific processing was selected).

If the determination result of processing at 512 is YES, the routine proceeds to 514, whereas, if the determination result is NO, the routine is exited.

Figure 11E:
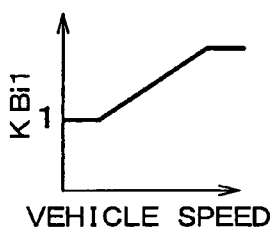
Figure 11F:
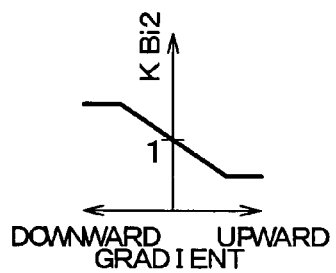
Figure 11G:
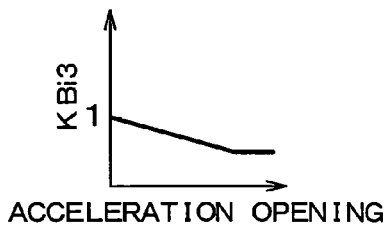
Figure 11H:
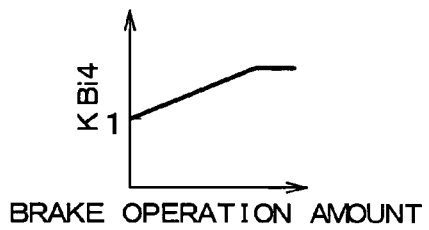
Figure 11I:
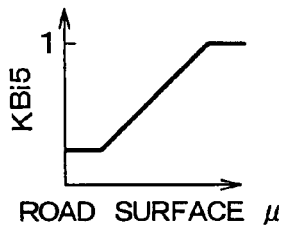

At 514, a brake control increase amount TBi is derived, and along with this, a W/C pressure increase control flag is set that indicates that the W/C pressure has been increased by the automatic brake control in order to generate braking force. The brake control increase amount TBi is set to become larger as the absolute value |dV| of the speed deviation dV becomes larger, or as the speed deviation gradient |dV|/dt becomes larger (when the speed deviation dV is in an increasing state), based upon Equation (5):

$$TBi = KBi1(Vso) \cdot KBi2(\text{slope}) \cdot KBi3(\text{accel.}) \cdot KBi4(\text{brake}) \cdot KBi5(\mu) \cdot (KBi6 \cdot |dV| + KBi7 \cdot |dV|/dt) \quad (5)$$

where, KBi1, as shown in FIG. 11(E), is a coefficient set to increase from 1 in accordance with acceleration of the vehicle; namely, when the vehicle is being stopped the driver is liable to feel vibrations of the vehicle body caused by braking, and thus the coefficient KBi1 is set such that the brake control increase amount becomes smaller: KBi2, as shown in FIG. 11(F), is a coefficient that is set to change in accordance with the road surface gradient; namely, the coefficient KBi2 is set to become smaller from 1 in accordance with increase in an upward slope gradient, and to become larger than 1 in accordance with increase in a downward slope gradient: KBi3, as shown by FIG. 11(G), is a coefficient which is set to decrease from 1 in accordance with increase in the accelerator opening, and which executes correction in accordance with the driver's intention: KBi4, as shown by FIG. 11(H), is a coefficient which is set to increase from 1 in accordance with increase in the brake operation amount, and which executes correction in accordance with the driver's intention: KBi5, as shown in FIG. 11(I), is set so as to decrease from 1 in accordance with decrease of the road surface $\mu$, and executes correction such that, when the road surface $\mu$ is low, the braking force is decreased in order to inhibit vehicle behavior from becoming unstable.

At 516 a new brake control amount BT is set by adding the brake control increase amount TBi determined as described above to a prior brake control amount BT (t−1). The routine is then exited.

In the vehicle speed deceleration processing according to this embodiment, while the engine control is in-progress, first, the engine control amount ET is decreased using the engine decrease amount TEd that is a decrease gradient; once the engine control has been completed, if downshift is possible, first, downshift is executed, and engine brake is applied; following this, the brake control amount BT is increased using the brake control increase amount TBi that is a increase gradient; and the vehicle speed is decreased to the target creep vehicle speed $\alpha$.

Moreover, if the absolute value |dV| of the speed deviation dV is large, the engine decrease amount TEd becomes large, and the engine control output rapidly becomes zero. In this case, in line with Equation (5), the control delay time DBT is set to become substantially zero. Accordingly, transition from the engine control to downshift or the brake control is executed continuously.

In the flow chart of FIG. 10, downshift or increase of the brake control amount is executed immediately following completion of the engine control (processing at 500). However, the downshift or increase of the brake control amount may be executed after the elapse of a predetermined time period after completion of the engine control.

Next, the flow of the vehicle speed acceleration processing that is executed at 312 of FIG. 6 will be explained with reference to FIG. 12. It should be noted that this vehicle speed acceleration processing flow corresponds to the vehicle speed acceleration unit of the invention.

At 550, it is determined whether automatic brake controls not directly related to the driver's brake operation, namely, brake control executed in the brake control of the starting assistance control or brake control of the VSC control, or the like, is being executed. This determination is executed in order to make sure that, first, the vehicle speed acceleration of the brake control is given priority in execution; when this automatic brake control is completed, an engine output increase processing of the vehicle speed acceleration processing is executed. If automatic brake control is being executed, the routine proceeds to 552, whereas, if automatic brake control is not being executed, the routine proceeds to 556.

Figure 13:
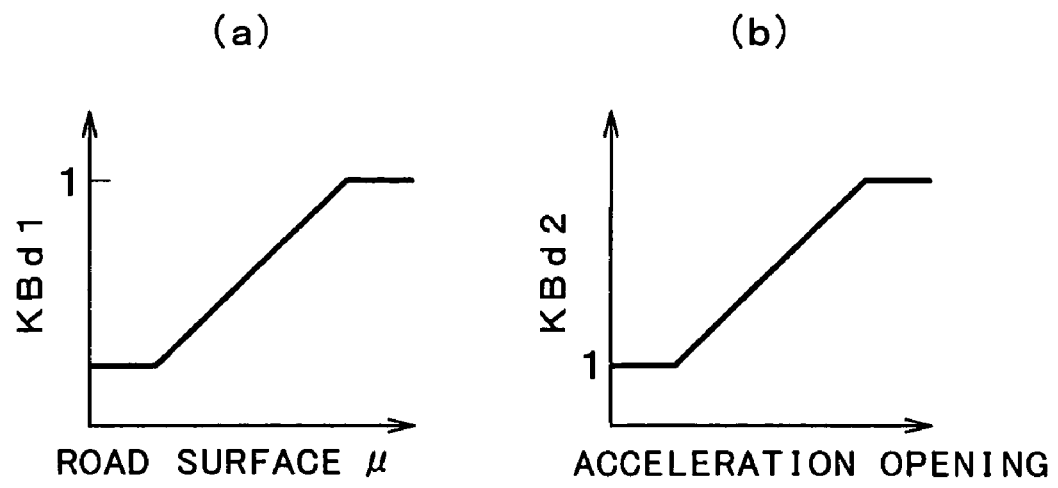
FIG. 13A to 13B are line diagrams that indicate characteristics of correction coefficients KBd1 and KBd2 of a brake decrease amount during a vehicle speed acceleration processing.

At 552, a brake decrease amount TBd for decreasing braking force for each control period is calculated based on Equation (6) in which the linear sum of the speed deviation dV (dV=α−Vs0) and the speed deviation gradient dV/dt is corrected using the road surface $\mu$ and the accelerator opening:

$$TBd = KBd1(\mu) \cdot KBd2(\text{accel.}) \cdot (KBd3 \cdot dV + KBd4 \cdot dV/dt) \quad (6)$$

where, KBd1, as shown in FIG. 13(A), is a coefficient that is set so as to decrease from 1 in accordance with decrease in the road surface $\mu$; this coefficient KBd1 executes correction such that the decrease amount of the braking force becomes smaller in order to minimize the impact on vehicle behavior when the road surface $\mu$ is low: KBd2, as shown in FIG. 13(B), is a coefficient that is set to increase from 1 in accordance with increase of the accelerator opening; this coefficient KBd2 executes correction such that the decrease amount of the braking force becomes larger, because it is necessary to rapidly release braking force when the accelerator opening is larger. Further, KBd3 and KBd4 are pre-set proportionality coefficients.

At 554, the brake decrease amount TBd determined as described above is taken as a decrease gradient, and a new brake control amount BT is set which is a value equal to a prior period brake control amount BT (t−1) minus the brake decrease amount TBd. The routine is then exited.

On the other hand, when it is determined that the automatic brake control is not being executed in at 550, at 556, an engine control increase amount TEi for increasing engine output is calculated. Along with this, a throttle opening control flag is set that indicates that control of throttle opening is being executed by the engine control in order to increase the engine output.

Figure 14A:
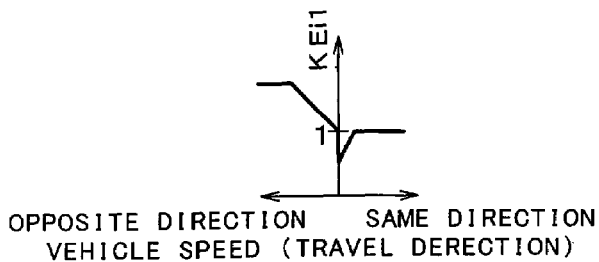
FIG. 14A to 14J are line diagrams that indicate characteristics of correction coefficients KBd1 and KBd2 of a brake decrease amount, correction coefficients KEi1 and KEi5 of an engine control increase amount, and correction coefficients R1 to R5 of an engine output emitter value during a vehicle speed acceleration processing.

The engine control increase amount TEi, more specifically, is calculated based on Equation (7) such that the engine control increase amount TEi becomes larger as the speed deviation dV becomes larger, or as the speed deviation gradient dV/dt becomes larger (when the speed deviation dV is in an increasing state), when the vehicle speed deviation dV is taken as $dV=\alpha-Vs0$, and the speed deviation gradient is taken as dV/dt:

$$TEi=KEi1(Vso) \cdot KEi2(\text{slope}) \cdot KEi3(\text{accel.}) \cdot KEi4 \\ (\text{brake}) \cdot KEi5(\mu) \cdot (KEi6 \cdot dV + KEi7 \cdot dV/dt) \quad (7)$$

where, KEi1, as shown in FIG. 14(A), is a correction coefficient for vehicle speed change. The correction coefficient value differs depending on whether the actual direction of travel of the vehicle indicated by the vehicle speed signal, and the direction of travel of the vehicle indicated by the shift position of the AT 90 are the same direction or opposite directions; namely, in the case of the same direction, when the shift position is the D, 2 or L position, the vehicle speed value is a forward direction value, or alternatively, when the shift position is the R position, the vehicle speed value is a backward direction value; on the other hand, in the case of the opposite direction, when the shift position is the D, 2 or L position, the vehicle speed value is a backward direction value, or alternatively, when the shift position is the R position, the vehicle speed value is a forward direction value.

The coefficient KEi1 is set so as to increase from 1 toward an upper limit that is larger than 1, in accordance with increase of the opposite direction vehicle speed from zero. Further, the coefficient KEi1 is set to increase from a value lower than 1 to an upper limit of 1, in accordance with increase of the same direction vehicle speed from zero toward an extremely low speed range. Namely, when the vehicle VL is progressing in the opposite direction, the coefficient KEi1 executes correction such that the engine control increase amount TEi becomes larger in order to rapidly change the vehicle direction of travel to the same direction. Moreover, when the vehicle VL is moving in the same direction but at an extremely low speed, the coefficient KEi1 executes correction such that the engine control increase amount TEi is made smaller in order to inhibit the driver from feeling a sense of shock due to rapid acceleration of the vehicle speed.

Figure 14B:
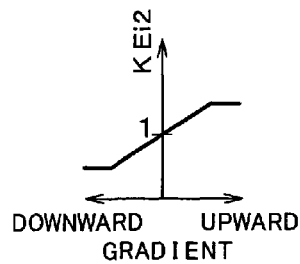
Figure 14C:
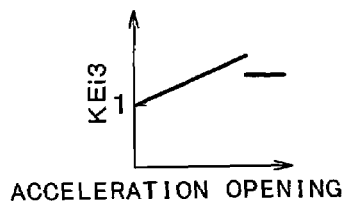
Figure 14D:
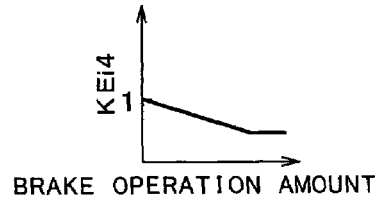
Figure 14E:
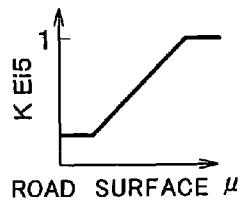
Figure 14F:
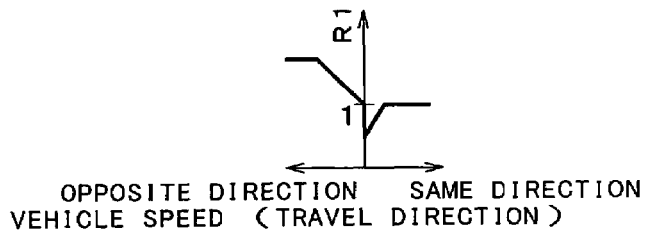
Figure 14G:
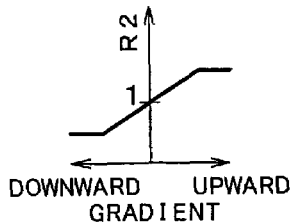
Figure 14H:
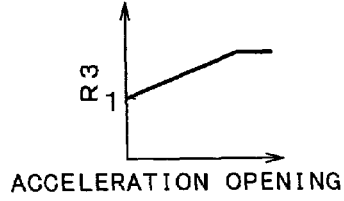
Figure 14I:
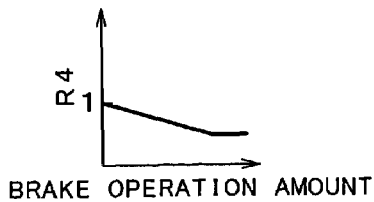
Figure 14J:
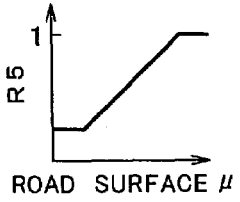

Further, in Equation (7) above, KEi2, as shown in FIG. 14(B), is a coefficient which is set so as to increase from 1 in accordance with the road surface gradient; namely, the coefficient KEi2 is set to increase from 1 in accordance with increase in an upward slope gradient, and to decrease from 1 in accordance with increase in a downward slope gradient; more specifically, the coefficient executes correction such that when the vehicle is on an upward slope the engine control amount TEi becomes larger in order to inhibit the vehicle from slipping backwards, and when the vehicle is on a downward slope, the engine control amount TEi becomes smaller in order to inhibit the vehicle from accelerating suddenly: KEi3, as shown in FIG. 14(C), is a coefficient which is set to increase from 1 in accordance with increase of the brake pedal operation amount, and which executes correction in accordance with the driver's intention: KEi4, as shown in FIG. 14(D), is a coefficient which is set to decrease from 1 in accordance with increase of the brake operation amount, and which executes correction in accordance with the driver's intention: KEi5, as shown in FIG. 14(E), is a coefficient which is set to decrease from 1 in accordance with decrease of the road surface $\mu$, and which executes correction by decreasing the engine control increase amount TEi when the road surface $\mu$ is low such that vehicle behavior is inhibited from becoming unstable: further, KEi6 and KEi7 are pre-set proportionality coefficients.

At 558, the engine control increase amount TEi determined as above is taken as an increase gradient, and a new brake control amount ET is set to be equal to the sum of a prior period engine control amount ET (t−1) and the engine control increase amount TCi.

Figure 7:
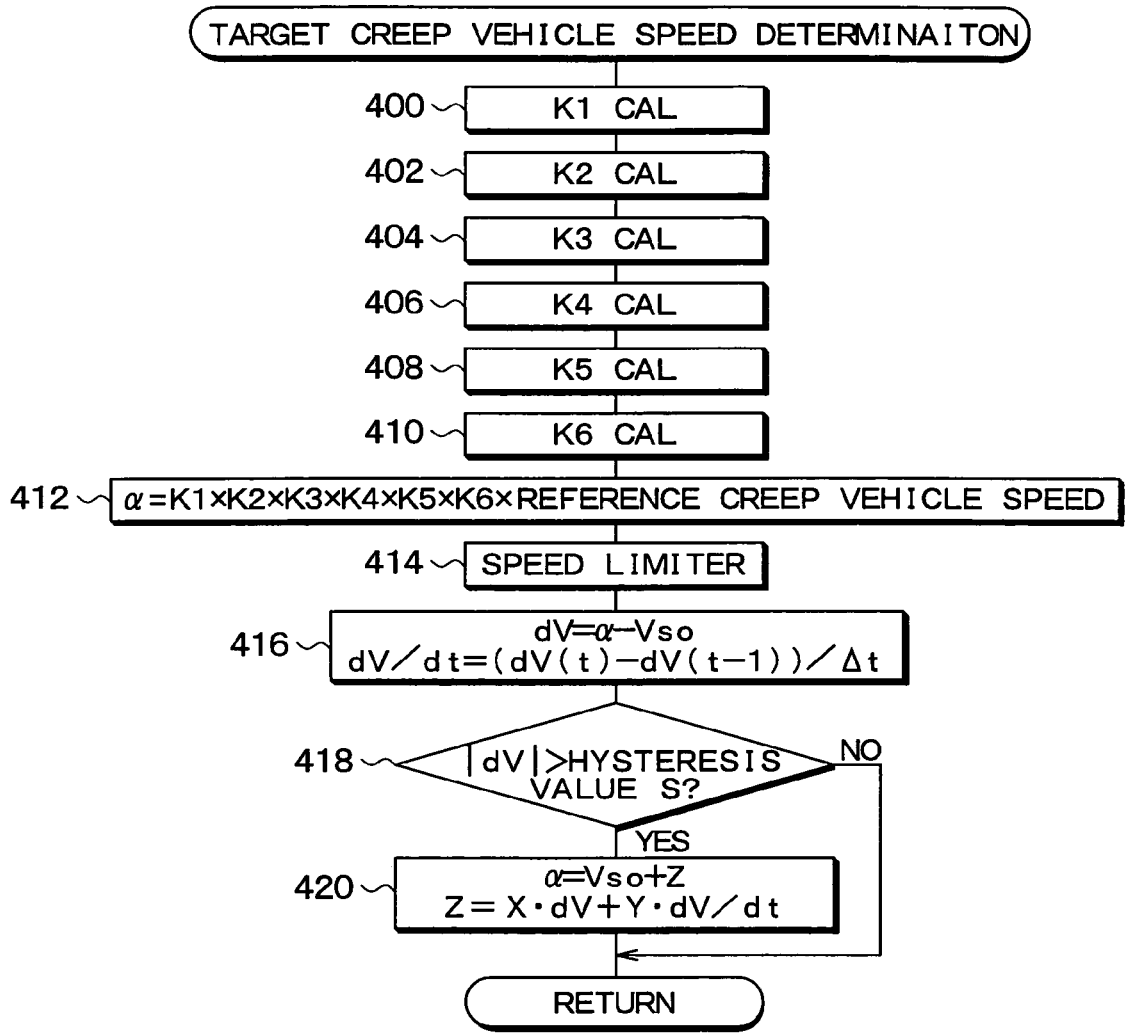
FIG. 7 is a flow chart showing a procedure for setting a target creep vehicle speed of the first embodiment.
Figure 8A:
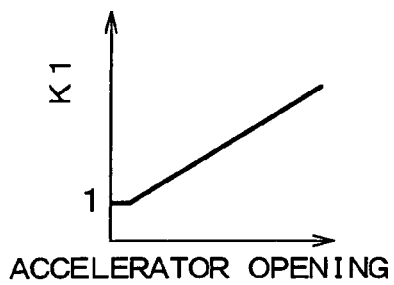
FIG. 8A to 8F are line diagrams that indicate respective characteristics of correction coefficients K1 to K6 for setting of the target creep vehicle speed.
Figure 8B:
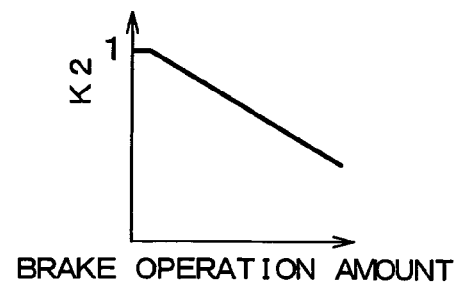
Figure 8C:
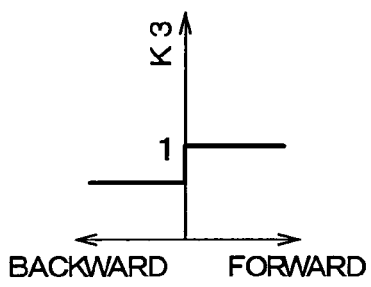
Figure 8D:
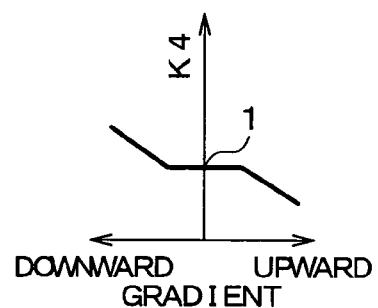
Figure 8E:
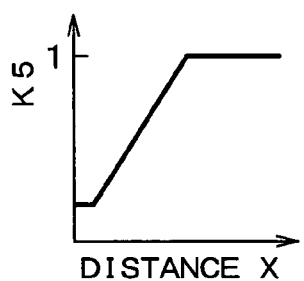
Figure 8F:
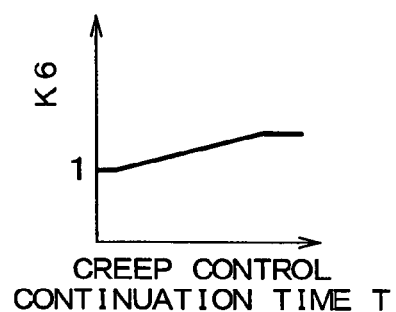

Next, at 560, an engine output limiter value MAXET that establishes a limit for the engine output so as to inhibit, for example, excessive engine output from being generated that is sufficient large to allow the vehicle to go over a concrete stop block in a parking lot, is calculated based upon Equation (8):

$$MAXET=R1(Vso) \cdot R2(\text{slope}) \cdot R3(\text{accel.}) \cdot R4(\text{brake}) \cdot R5 \\ (\mu) \cdot MAXET_{init} \quad (8)$$

where, R1 to R5 are coefficients shown respectively in FIGS. 14(F) to (J); the respective descriptions and settings of these correction coefficients R1 to R5 correspond to and are the same as those of the aforementioned coefficients KEi1 to KEi5, respectively. As shown in FIG. 7, the engine output is corrected in accordance with the vehicle speed, the road surface gradient, the accelerator opening, the brake operation amount, and the road surface $\mu$. Bearing this correction in mind, a reference value $MAXET_{init}$ is corrected based upon Equation (8), and is set as the limiter value MAXET.

At 562, the smaller of the engine control amount ET and the engine output limiter value MAXET is selected as a min (ET, MAXET), and this is set as the engine control amount ET.

Next, at 564, in the case that the limiter value MAXET has been set as the engine control amount ET, the routine proceeds to 566. If this is not the case, the routine is terminated.

At 566, when the vehicle stops or a movement direction of the vehicle is opposite to a direction defined by the shift position regardless the engine control amount ET reaches the limiter value MAXET, the processing proceeds to 568, otherwise the acceleration processing is terminated.

At 568 it is not possible to execute vehicle starting with the starting assistance control (processing 150, namely, processing from 300 to 312). Thus, requirements are output for engine output decrease and generation of stop maintenance braking force so as to maintain a stopped state of the vehicle. Along with this, the starting assistance control of the vehicle is prohibited.

As described above, in the vehicle speed acceleration processing of the vehicle speed acceleration unit, if the automatic brake control is in-progress, first, the brake control amount BT is decreased by the brake decrease amount TBd that is a decrease gradient; after the automatic brake control is completed, the engine control amount ET is increased by the engine control increase amount TEi that is an increase gradient. Then, if the engine control increase amount TEi is too large, the engine control amount ET is increased to the limiter value MAXET, and the vehicle speed is increased to the target creep vehicle speed $\alpha$.

It should be noted that in the flow chart of FIG. 12 the engine output increase processing (processing at 556) is executed immediately after the brake control is completed (processing at 550). However, a delay time may be provided instead.

In this way, control is executed such that the actual vehicle speed is maintained within the range of the target creep vehicle speed $\alpha \pm \beta$, by the vehicle speed deceleration processing at 310 and the vehicle speed acceleration processing at 312 of FIG. 6.

Next, the operation flow (refer to FIG. 15) of the bridge control (processing at 314) that is selected when the driver has the acceleration intention or the stop maintenance intention (refer to FIG. 6) will be explained. In this bridge control is executed such that the engine control amount and the brake control amount converge on and eventually equal values that accord with the operation amount of the driver.

Figure 15:
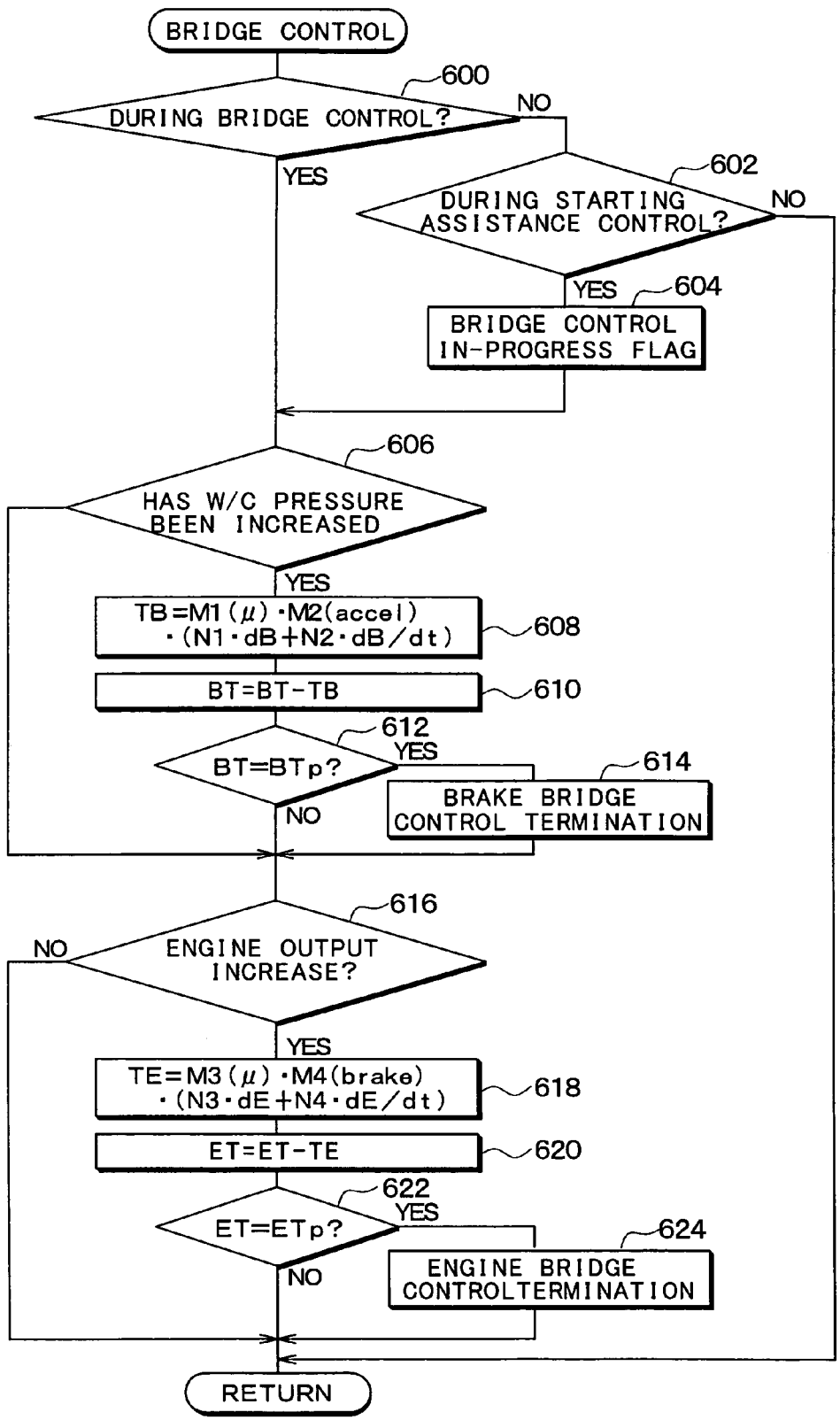
FIG. 15 is a control flow chart of a bridge control of the first embodiment.

At 600 of FIG. 15 it is determined whether the bridge control is presently in-progress based on the state of a bridge control in-progress flag (refer to processing at 604). If control is being executed, the routine proceeds to 606, whereas, if control is not being executed the routine proceeds to 602.

At 602, in a state in which the driver has the acceleration intention or the stop maintenance intention, and in which the bridge control is not in-progress, it is determined whether the starting assistance control is in-progress. If it is determined that the starting assistance control is being executed (YES), the routine proceeds to 604 in order to shift from the starting assistance control to the bridge control. If it is determined that the starting assistance control is not being executed (NO), there is no need to execute the bridge control and the routine is exited.

At 604, the bridge control in-progress flag is set, and the flag set at 304 indicating that starting assistance control is in-progress is cleared.

At 606 it is determined whether W/C pressure has been increased in order to generate braking force by the automatic brake control. In particular, this is applicable to a case where braking force has been generated by the automatic brake control on a downward slope. In this determination, it is determined that the W/C pressure has been increased in this processing if, for example, the W/C pressure increase control flag has been set at 514 of FIG. 10. In addition, if the result of processing at 606 is YES, the routine proceeds to 608, whereas, if the result is NO, the routine proceeds to 616.

Figure 16A:
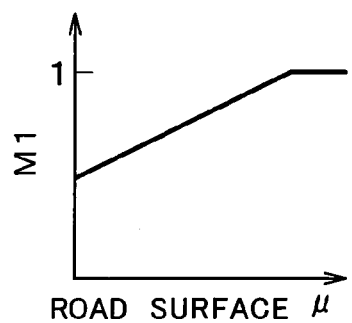
FIG. 16A to 16D are line diagrams that indicate characteristics of correction coefficients M1 and M2 of a brake bridge control change amount, and correction coefficients M3 and M4 of an engine bridge control change amount.
Figure 16B:
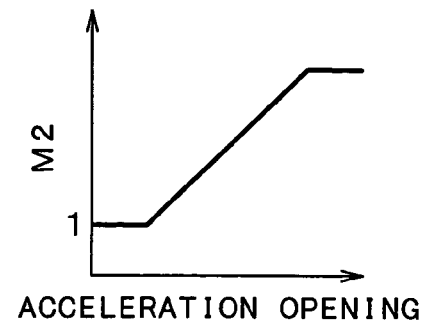

At 608, a brake bridge control change amount TB is set so as to provide a change amount for each control cycle for the brake control amount, in order to decrease the braking force. In the case that the brake control amount BT has been set in the automatic brake control, this brake control amount BT is given priority over a brake control amount BTp that accords with the brake pedal operation amount, and thus braking force is generated based on the brake control amount BT. However, in the case that the difference between the brake control amount BT of the automatic brake control and the brake control amount BTp that accords with the brake pedal operation amount is substantial, it is preferable that the brake control amount BT of the automatic brake control is corrected so as to decrease the magnitude of the difference as rapidly as possible. Accordingly, when the deviation between the brake control amount BT of the automatic brake control and the brake control amount BTp that accords with the brake pedal operation amount is taken to be dB=BT−BTp, and a gradient of this deviation is taken to be dB/dt, the brake bridge control change amount TB is set so as to increase as the braking force deviation dB increases, and as the deviation gradient dB/dt increases (when the braking force deviation is in an increasing state). More particularly, the brake bridge control change amount TB is calculated based on Equation (9)

$$TB=M1(\mu) \cdot M2(\text{accel.}) \cdot (N1 \cdot dB+N2 \cdot dB/dt) \quad (9)$$

where, M1, as shown in FIG. 16(A) is a coefficient which is set to decrease from 1 in accordance with decrease of the road surface μ, and which executes correction so as to decrease the decrease amount of the braking force in order to minimize instability in the vehicle behavior when the road surface μ is low: M2, as shown in FIG. 16(B), is a coefficient which is set to increase from 1 in accordance with increase in the accelerator opening, and which executes correction so as to increase the decrease amount of the braking force since it is necessary to release the braking force rapidly when the acceleration opening degree is large: further, N1 and N2 are pre-set proportionality coefficients.

At 610, the brake control amount BT of the automatic brake control is renewed using a value that is equal to the brake control amount BT of the present control minus the aforementioned brake bridge control change amount TB.

At 612, it is determined whether the renewed brake control amount BT has become equal to the brake control amount BTp that accords with the brake pedal operation amount. If the result is YES, at 614, the W/C pressure increase flag is reset, and the brake bridge control is terminated. If the result is NO, the routine proceeds to 616.

At 616 it is determined whether control of the throttle opening is being executed by the engine control that is in-progress in order to increase the engine output. In particular, this applies to a case when engine output is being raised by the engine control on an upward slope. In this determination it is determined that the throttle opening is being controlled based upon the engine control in this processing if, for example, the throttle opening control flag is set at 556 of FIG. 12. In addition, if the result of processing at 616 is YES, the routine proceeds to 618, whereas, if the result is NO, the bridge control routine is exited.

Figure 16C:
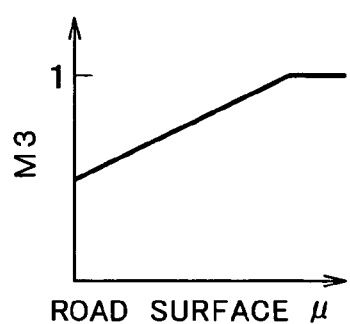
Figure 16D:
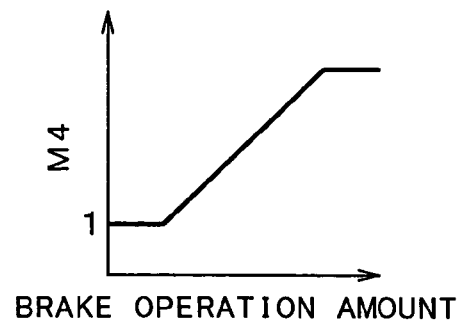

At 618, the engine bridge control change amount TE that provides the change amount for the engine control amount is set such that the engine output is decreased for each period. In the case that the engine control amount ET of the engine control is set, this engine control amount ET is given priority over an engine control amount ETp that accords with the accelerator pedal operation amount, and thus the engine output is generated based on the engine control amount ET. However, in the case that the difference between the engine control amount ET of the engine control and the engine control amount ETp that accords with the accelerator pedal operation amount is substantial, it is preferable that the engine control amount ET of the engine control is corrected so as to decrease the magnitude of the difference as rapidly as possible. Accordingly, when the deviation between the engine control amount ET of the engine control and the engine control amount ETp that accords with the accelerator pedal operation amount is taken to be dE=ET−ETp, and a gradient of this difference is taken to be dE/dt, the engine bridge control change amount TE is set so as to increase as the engine output deviation dE increases, and as the deviation gradient dE/dt increases (when the engine output deviation is in an increasing state). More particularly, the engine bridge control change amount TE is calculated based on Equation (10):

$$TE=M3(\mu) \cdot M4(\text{brake}) \cdot (N3 \cdot dE+N4 \cdot dE/dt) \quad (10)$$

where, M3, as shown in FIG. 16(C), is a coefficient that is set so as to decrease from 1 in accordance with decrease of the road surface μ, and which executes correction so as to reduce the reduction amount of the engine output in order to minimize instability in vehicle behavior when the road surface μ is low: M4, as shown in FIG. 16(D) is a coefficient which is set to increase from 1 in accordance with increase in the brake pedal operation amount, and which executes correction so as to increase the decrease amount of the braking force since it is necessary to decrease the engine output rapidly when the brake operation amount is large: further, N3 and N4 are preset proportionality coefficients.

At 620, the engine control amount ET that provides a target engine output is renewed with a value equal to the engine control amount ET of the present control minus the engine bridge control change amount TE.

At 622, it is determined whether the renewed engine control amount ET has become equal to the engine output ETp that accords with the accelerator pedal operation amount. If the result is YES, at 624, the throttle opening control flag is reset and the engine bridge control is terminated. If the result is NO, the bridge control routine is exited.

In this way, the brake control amount or the engine control amount set in the bridge control routine, namely, the respective brake control amount BT or the engine output ET of the automatic control, is gradually changed (each control cycle) so as to respectively equal the brake control amount BTp or the engine output ETp that accord with respective pedal operations, by using the brake bridge control change amount TB or the engine bridge control change amount TE as change gradients.

Following this, the processing of the starting assistance control of processing at 150 (refer to FIG. 3) is completed.

Figure 17:
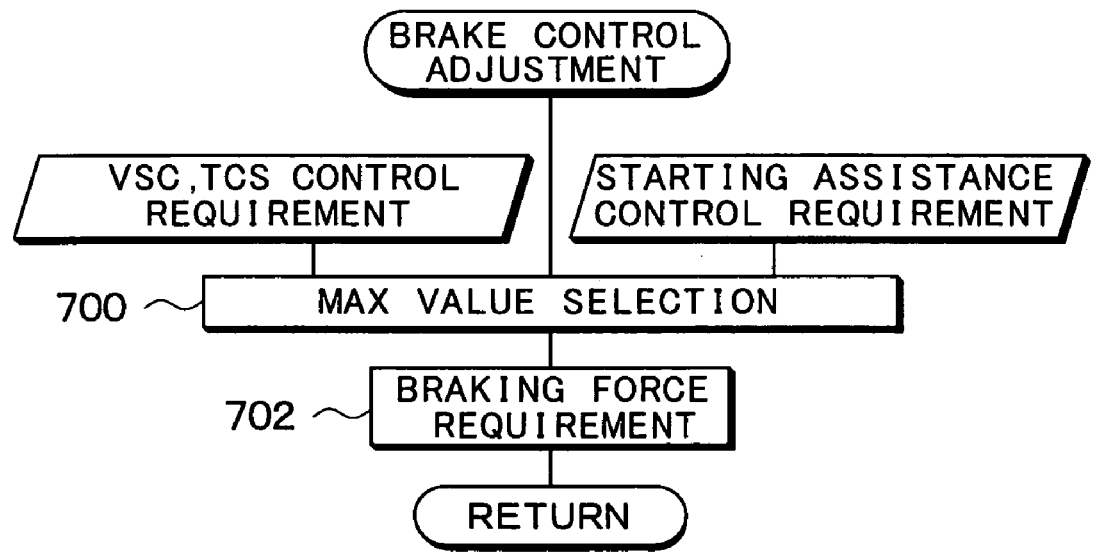
FIG. 17 is a flow chart showing a procedure executed during brake adjustment in the first embodiment.

Next, a procedure of brake control adjustment of processing at 160 will be explained with reference to the flow chart of FIG. 17.

At 700, the braking force requirement for the VSC control and the TCS control set at 140 is compared with the braking force requirement of the starting assistance control set at 150, and the larger of these values is selected.

Next, at 702, the selected braking force requirement is set as a brake command value for each wheel.

Figure 18:
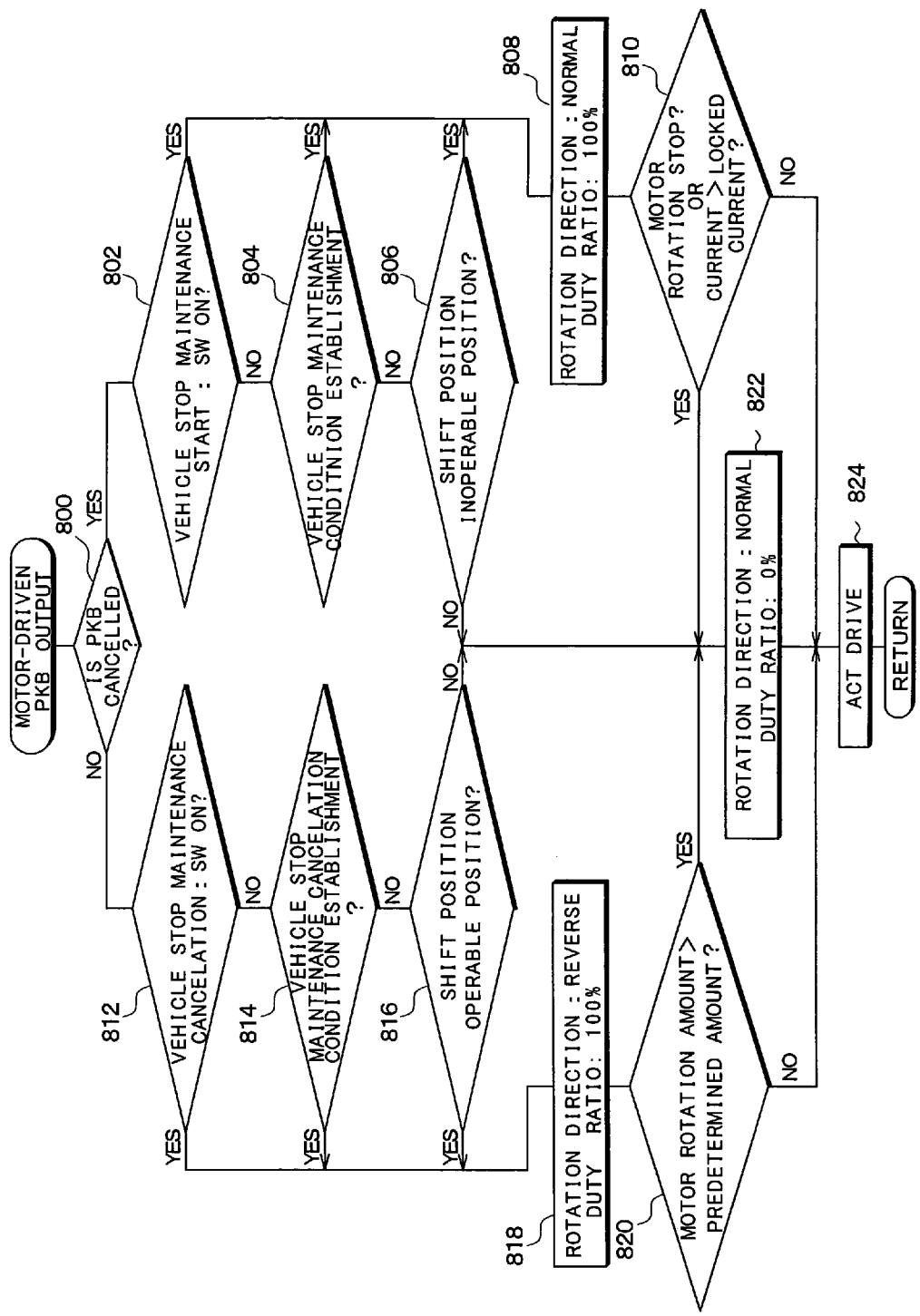
FIG. 18 is a flow chart showing a procedure for a motor-driven parking brake (PKB) output of the first and second embodiments.

FIG. 18 is a flow chart of output processing for the motor-driven PKB 3 that is executed at 190.

At 800, it is determined whether the present operation state of motor-driven PKB 3 is a cancelled state or not. If the motor-driven PKB 3 is in the cancelled state the routine proceeds to 802, whereas, if the result is NO, namely, if it is in a locked state, the routine proceeds to 812.

At 802, it is determined whether the vehicle stop maintenance start switch 56 has been switched to ON, namely, whether, a motor-driven PKB 3 lock requirement has been generated. If the result is YES, the routine proceeds to 808 and drive conditions for a locking operation are set. If the result is NO, the routine proceeds to 804.

At 804, if the vehicle stop maintenance condition, for example, whether the brake pedal has been depressed for four seconds or more since stopping of the vehicle VL, is satisfied, the routine proceeds to 808; however, if not satisfied, the routine proceeds to 806.

At 806, if the shift position is a position that makes drive inoperable (i.e., the P or N positions), the routine proceeds to 808; however, if the position makes drive operable (i.e., the D, 2 or L positions), the routine proceeds to 822, and the drive conditions for stopping drive of the motor-driven PKB 3 are set.

At 808, the motor drive conditions for locking the motor-driven PKB 3 are set such that drive is executed at a 100% duty ratio with a normal rotation direction.

At 810, it is determined whether the locking operation of the motor-driven PKB 3 is completed, namely, the locking operation is completed when rotation stops of the motor that is being driven so as to reach a locked state. Further, as the method for determining whether the motor has stopped, it is possible to utilize the actual rotation speed of the motor, or alternatively, it is possible to use a motor current that corresponds to a locked current. If this determination result is YES, the routine proceeds to 822 and the motor drive conditions are set such that drive is executed with a 0% duty ratio and a normal rotation direction; in other words, the drive conditions are set so that the motor is not driven. Following this, the routine proceeds to 824. On the other hand, if the result is NO, the routine proceeds directly to 824, and in this processing, the actuator (the motor) is driven in accordance with the set drive conditions.

Meanwhile, when the motor-driven PKB 3 is in a locked state, at 812, it is determined whether the switch operation for the release requirement of the motor-driven PKB 3 (for example, switching the vehicle stop maintenance start switch 56 to OFF) has been executed. If the result is YES, the routine proceeds to 818 and the motor drive conditions for the cancel operation are set. If the result is NO, the routine proceeds to 814.

At 814, when the locking operation of the motor-driven PKB 3 is being executed due to the vehicle stop maintenance start condition being satisfied, if the condition, for example, "accelerator pedal operation present", is satisfied, the routine proceeds to 818. If such a condition is not satisfied, the routine proceeds to 816.

At 816, when the locking operation of the motor-driven PKB 3 is being executed due to satisfaction of the drive inoperable position condition of the shift position, if the shift position is shifted to a drive operable position (i.e., the D, 2 or L positions), the routine proceeds to 818. If the shift position is the drive inoperable position (i.e., the P or N positions) the routine proceeds to 822.

At 818, the motor drive conditions for releasing the motor-driven PKB 3 are set such that drive is executed at a 100% duty ratio with a reverse rotation direction.

At 820, when a rotation amount of the motor of the motor-driven PKB 3 reaches a predetermined amount (e.g., a position that is returned by 15 mm from the locked position), the release operation is completed. If this condition is satisfied, the routine proceeds to 822, and the motor drive conditions are set such that drive is not executed; however, if the conditions are not satisfied, the routine proceeds to 824, and the motor is driven in accordance with the set drive conditions.

As described above, according to the first embodiment, in the case that the driver has neither one of the acceleration intention or the stop maintenance intention, the target creep vehicle speed α is set, and the vehicle speed deceleration processing or the vehicle speed acceleration processing is executed. Accordingly, it is possible to control the actual vehicle speed such that it becomes the target creep vehicle speed α or a value within a fixed range in the vicinity of the target creep vehicle speed α.

The target creep vehicle speed α is set in accordance with the driver's driving operations (the accelerator opening, the brake operation amount, etc.), the driving state (the direction of travel of the vehicle, distance from obstacles, etc.), and the road surface conditions (the road surface gradient). Thus, it is possible to set the target value in accordance with circumstances. Moreover, in the case that the deviation of the actual vehicle speed and the target creep vehicle speed α is large, the new target value is set to a value that gradually changes from the actual vehicle speed based on a value that is in accordance with the deviation amount. Accordingly, it is possible to set the target value in accordance with the actual driving conditions.

In the vehicle speed deceleration processing, after the engine output is decreased, downshift and the brake control amount increase processing is executed, and thus it is possible to smoothly decrease the vehicle speed to the target value.

In the vehicle speed acceleration processing, after the braking force is cancelled, the engine output is increased up to the limit value, and thus it is possible to smoothly increase the vehicle speed to the target value without generating excessive engine output.

In the vehicle speed deceleration processing and the vehicle speed acceleration processing, the increase amount and the decrease amount of the braking force, and the increase amount and the decrease amount of the engine output are corrected in accordance with the driver's driving operations (the accelerator opening, the brake operation amount, etc.), the driving state (the vehicle speed, the direction of travel of the vehicle, etc.), and the road surface conditions (the road surface μ the road surface gradient, etc.). Accordingly, it is possible to execute vehicle speed control that is in accordance with driving operations and which does not impact on vehicle behavior.

Thus, on sloping roads, such as upward sloping and downward sloping roads, it is possible to make the vehicle VL drive at low speed in the direction in which the vehicle VL is facing. Therefore, it is possible to execute starting of the vehicle VL more easily.

Moreover, when the vehicle speed control is completed in which the target creep vehicle speed α is set to the target value in accordance with operations that are based on the driver's acceleration intention and stop maintenance intention, the brake control amount and the engine control amount are changed by the bridge control such that the braking force and the engine output are in accordance with the driver's respective operations of the accelerator and brake pedals. Thus, it is possible to smoothly execute the acceleration operation and stop maintenance operation of the vehicle VL.

(Second Embodiment)

Next, a creep drive control device according to the second embodiment of the invention will be explained. The second embodiment is configured to have exactly the same structure and operation as the first embodiment, with the exception of the details of the processing of the brake control adjustment of processing at 160 (refer to FIG. 3). Hereinafter, an explanation will only be given concerning this point of difference. A description of the other structure, the operation, and the drawings of the second embodiment will be omitted.

Figure 19:
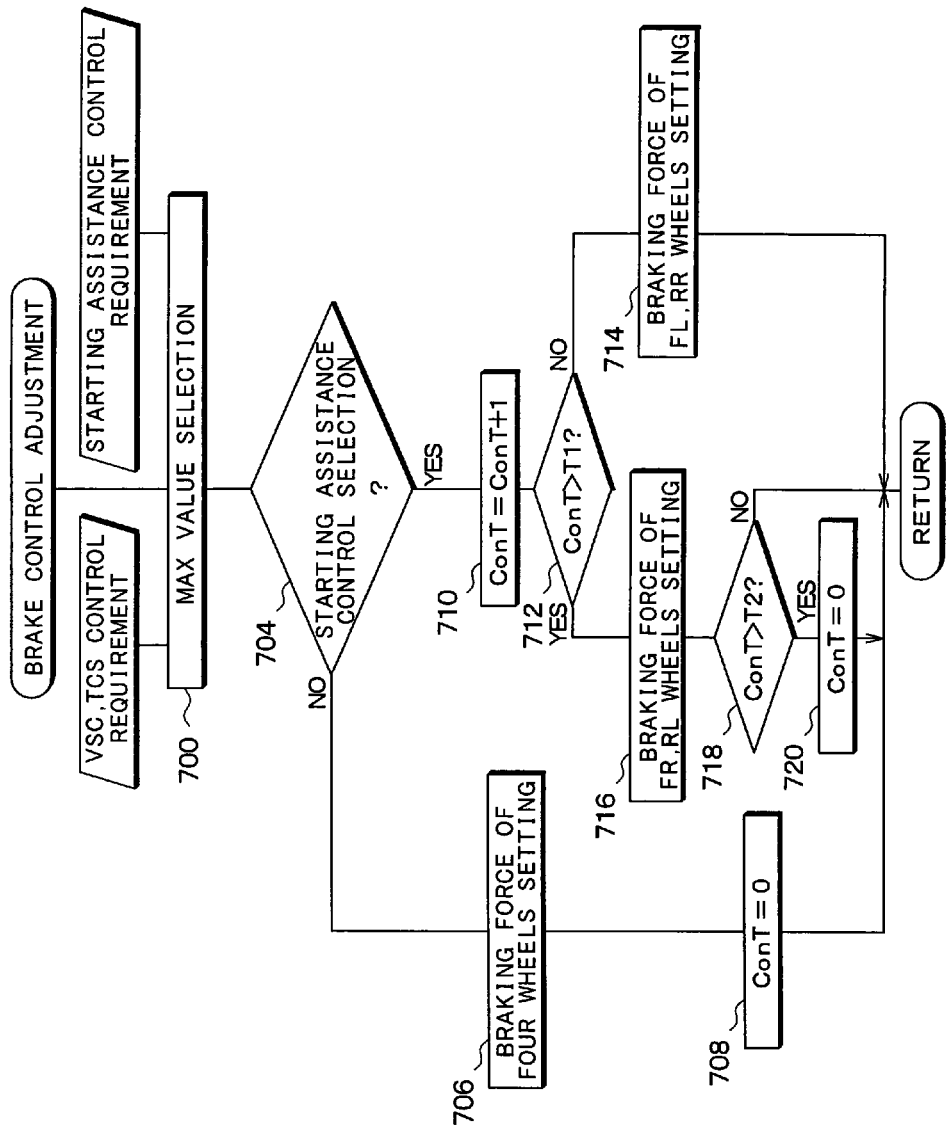
FIG. 19 is a flow chart showing a procedure executed during brake adjustment in the second embodiment.

FIG. 19 shows a flow chart of brake control adjustment according to the second embodiment.

At 700, as with the first embodiment, the braking force requirement value of the VSC control and TCS control and the braking force requirement value of the starting assistance control set at 150 are compared, and the larger value is selected.

At 704, if the braking force requirement value selected at 700 is the braking force requirement value of the starting assistance control, the routine proceeds to 710. However, if the other braking force requirement value is selected, the routine proceeds to 706.

At 706, the braking force of the four wheels is set in accordance with the braking force requirement value of the VSC control and the TCS control, and then at 708, a control time timer ConT of the starting assistance control is cleared.

At 710, the control time timer ConT is increased by an increment of 1, and next, at 712, it is determined whether the control time timer ConT has exceeded a predetermined time T1.

If the result of processing at 712 is NO, at 714, a control pressure is set such that braking forcing is only applied to two of the diagonally connected wheels (the wheels 4FR and 4RL).

If the result of processing at 712 is YES, the routine proceeds to 716, and application of the braking force is switched to the other two diagonally connected wheels (the wheels 4FR and 4RL).

In the determination of processing at 718, it is determined whether the control time timer ConT equals a predetermined time T2 that corresponds to double the predetermined time T1 (T2=2×T1). In addition, if the predetermined time T2 has elapsed, the control time timer ConT is cleared at 720, and after this, next time, the processing switches to applying braking force to the other two diagonally connected wheels. If the predetermined time T2 has not elapsed, the routine is directly exited.

In this way, according to the second embodiment, the braking force of the vehicle speed deceleration processing executed during the starting assistance control is switched each time the predetermined time T1 elapses, from being applied to one set of the two diagonally connected wheels to the other set of the two diagonally connected wheels. Accordingly, it is possible to decrease the energizing time for each of the actuators of the control valves, and so on, which is beneficial from the point of view of the maintenance lifetime of the hydraulic brake device 2.

(Third Embodiment)

Next, a creep drive control device of a third embodiment according to the invention will be explained. This third embodiment, like the first and second embodiments, is provided with the same structural elements as shown in FIG. 1 of the entire structure and is also provided with the hydraulic brake device (FIG. 2). Accordingly, an explanation of these structural elements will be omitted here.

Figure 20:
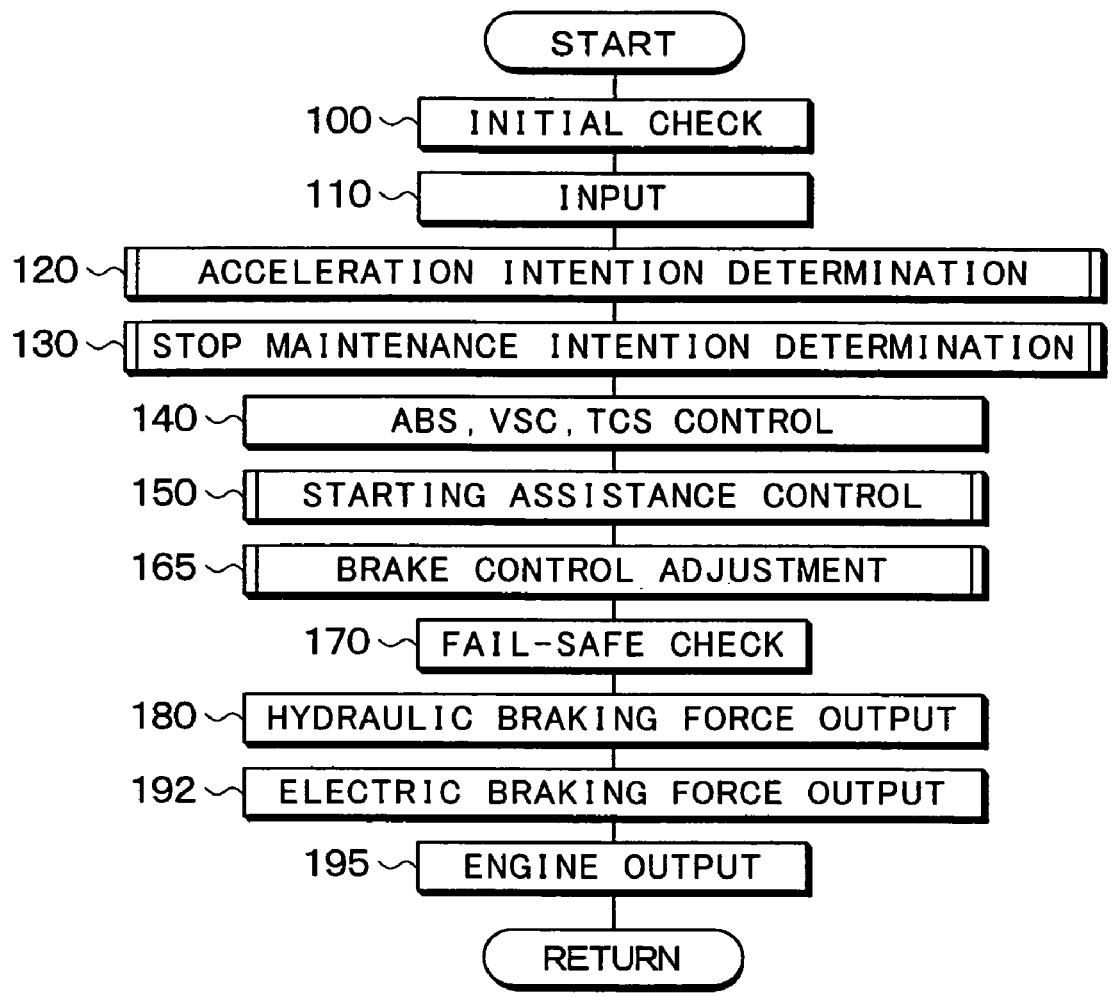
FIG. 20 is a flow chart showing a procedure for a creep drive control device of a third embodiment according to the present invention.

FIG. 20 shows a main flow chart of a creep drive control device according to the third embodiment. This flow chart differs from that of the first and second embodiments with respect to the details of the processing at 165 and 192, in which the application method for the braking force of the starting assistance control is different. However, all the other processing are the same as those shown in FIG. 3; accordingly, the same reference characters are used to denote sections that are the same, and an explanation is omitted here.

Figure 21:
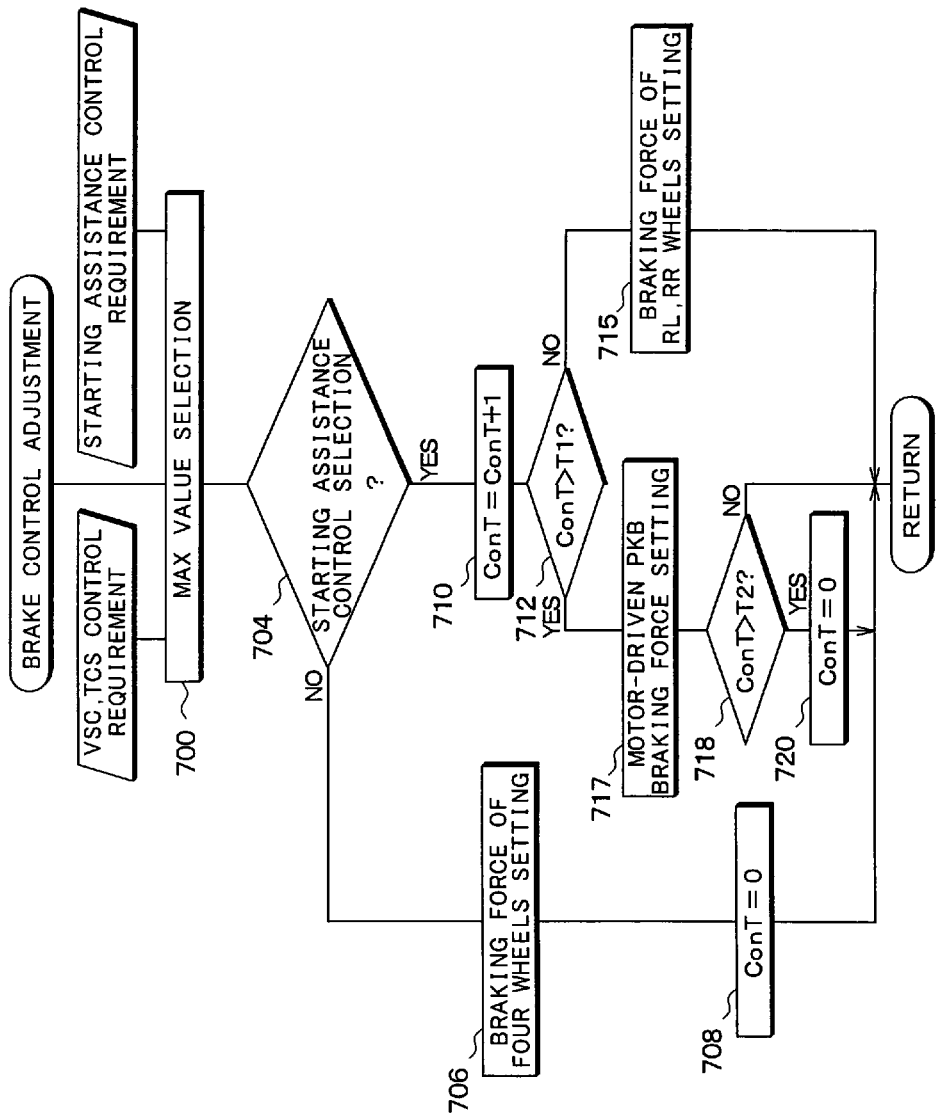
FIG. 21 is a flow chart showing a procedure executed during brake adjustment in the third embodiment.

The procedure of brake control adjustment of processing 165, will be explained with reference to the flow chart of FIG. 21.

At 700, as with the first and second embodiments, the braking force requirement value of the VSC control and the TCS control and the braking force requirement value of the starting assistance control set at 150 are compared, and the larger value is selected. Moreover, if any other braking force requirement values are output from other automatic control ECUs, such as the congestion adaptive cruise control ECU (not shown), these values may also be incorporated within the comparison of this processing.

At 704 to 708, 710 and 712, the same processing as in the respective processing of the second embodiment is executed, and thus an explanation will be omitted here.

At 715, during the period when the control time timer ConT of the starting assistance control is less than or equal to the predetermined time T1, the braking force is only applied by the hydraulic braking device 2 to the rear wheels 4RL and 4RR.

On the other hand, when the control time timer ConT exceeds the predetermined time T1, at 717, the brake pressure of the motor-driven PKB 3 is set in order to switch generation of the braking force for the rear wheels from the hydraulic brake device 2 to the motor-driven PKB 3.

As even more time elapses and the control time timer ConT exceeds the predetermined time T2 (processing at 718), the control time timer ConT is cleared as in the aforementioned second embodiment (processing at 720). As a result, from next time, the braking force of the rear wheels 4RR and 4RL switches to being generated by the hydraulic brake device 2.

Figure 22:
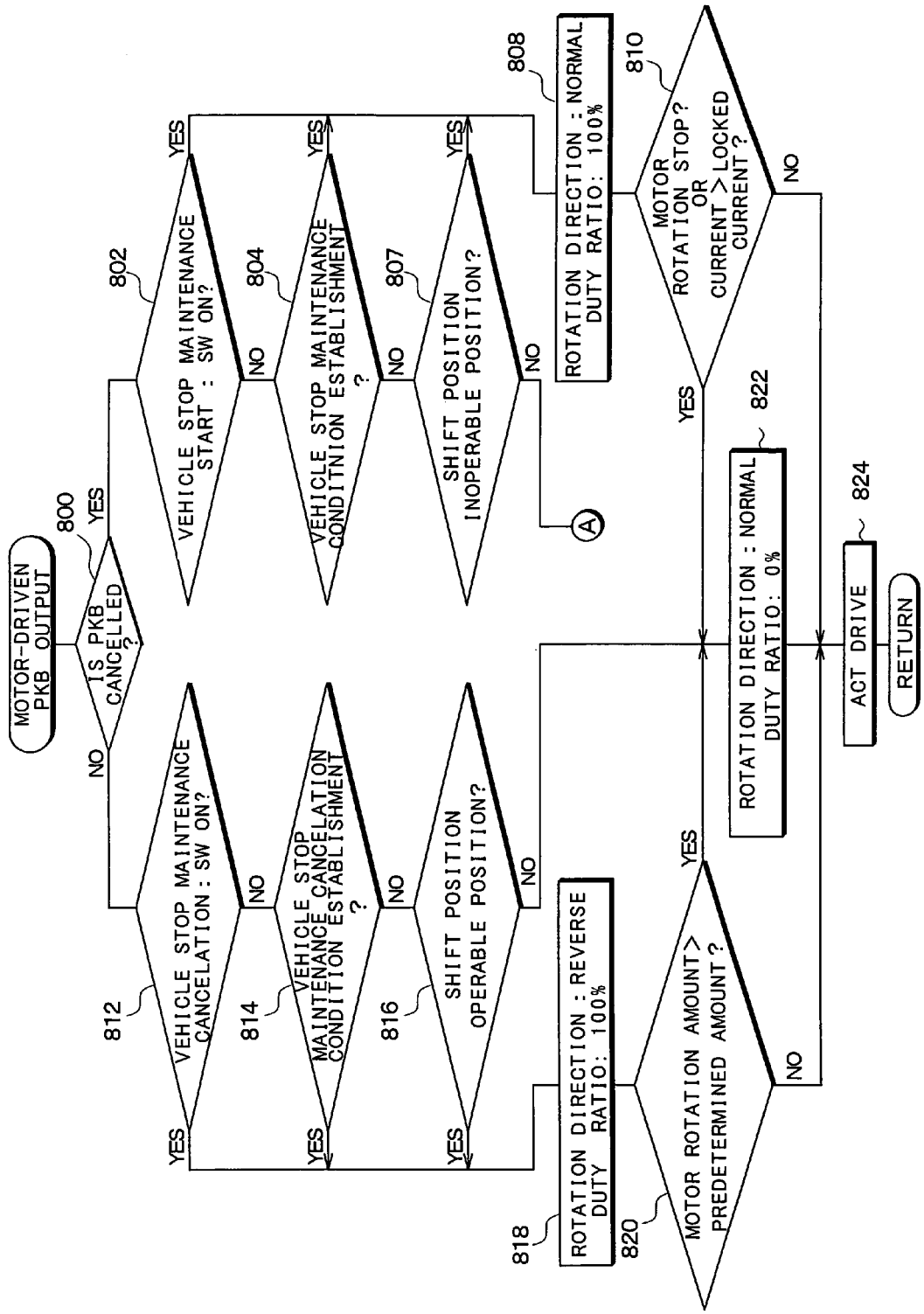
FIG. 22 is a section of a flow chart showing a procedure for a motor-driven PKB output of the third embodiment.
Figure 23:
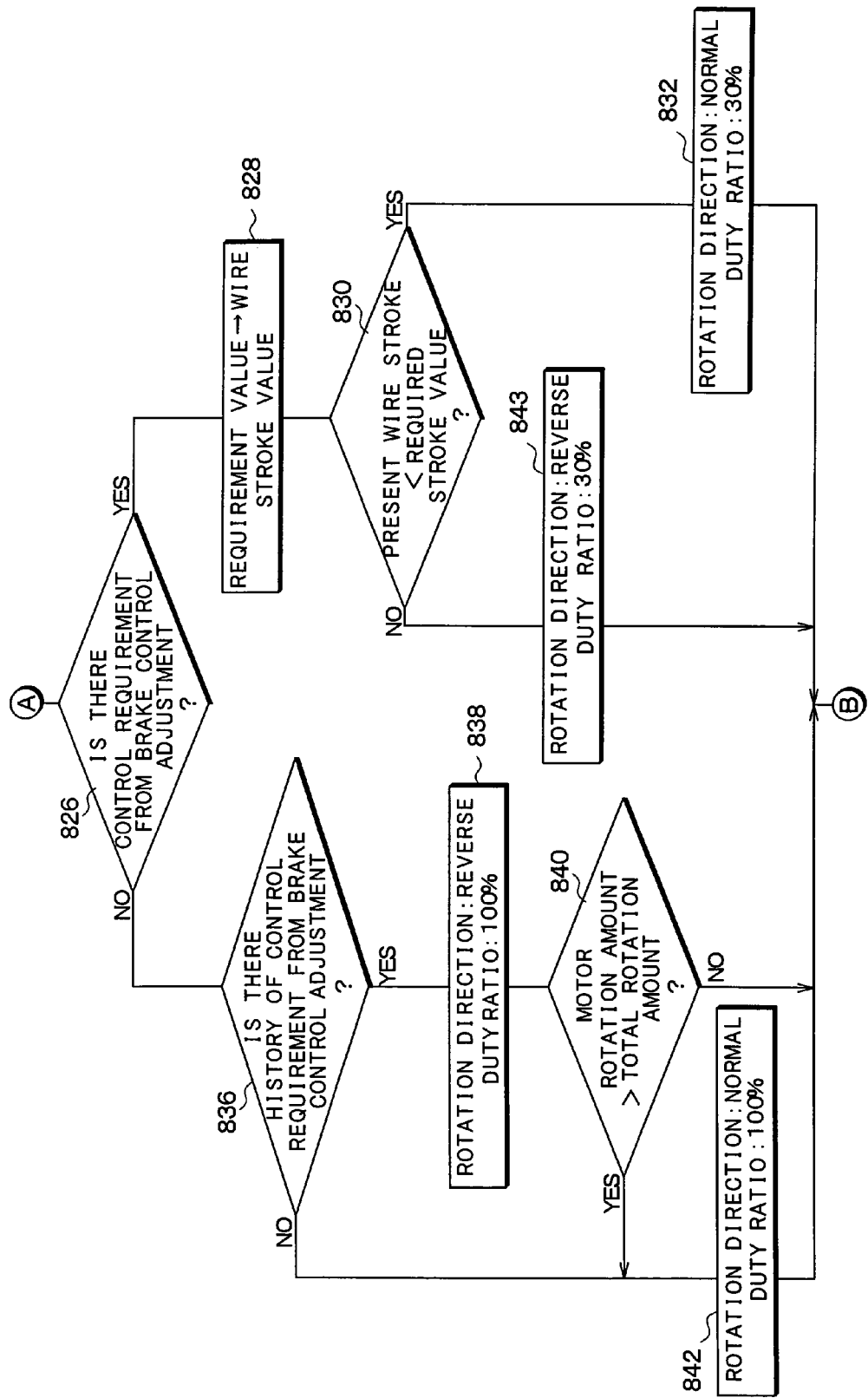
FIG. 23 is another section of the flow chart showing the procedure for the motor-driven PKB output of the third embodiment.

Moreover, according to the third embodiment, the output processing for the motor-driven PKB 3 at 195 is different to that of the first and second embodiments. FIGS. 22 and 23 are flow charts showing the procedure for this output processing.

With the exception of processing at 807, 800 to 824 are the same as those in the first and second embodiments above, and thus an explanation will be omitted here.

At 807, if the shift position is a position that makes drive inoperable (i.e., the P or the N position), the routine proceeds to 808, as is the case with the previous embodiments. However, the routine differs from those of the previous embodiments with respect to the fact that if the shift position is a position that makes drive operable (i.e., the D, 2 or L position), the routine proceeds to 826 (refer to FIG. 23) instead of processing at 822.

In other words, at 826 it is determined whether there is a control requirement for the motor-driven PKB 3 from the brake control adjustment, namely, it is determined whether the braking force for the motor-driven PKB 3 is set at 165, or more specifically, at 717. If the result is YES, the routine proceeds to 828, whereas, if the result is NO, the routine proceeds to 836.

Figure 24:
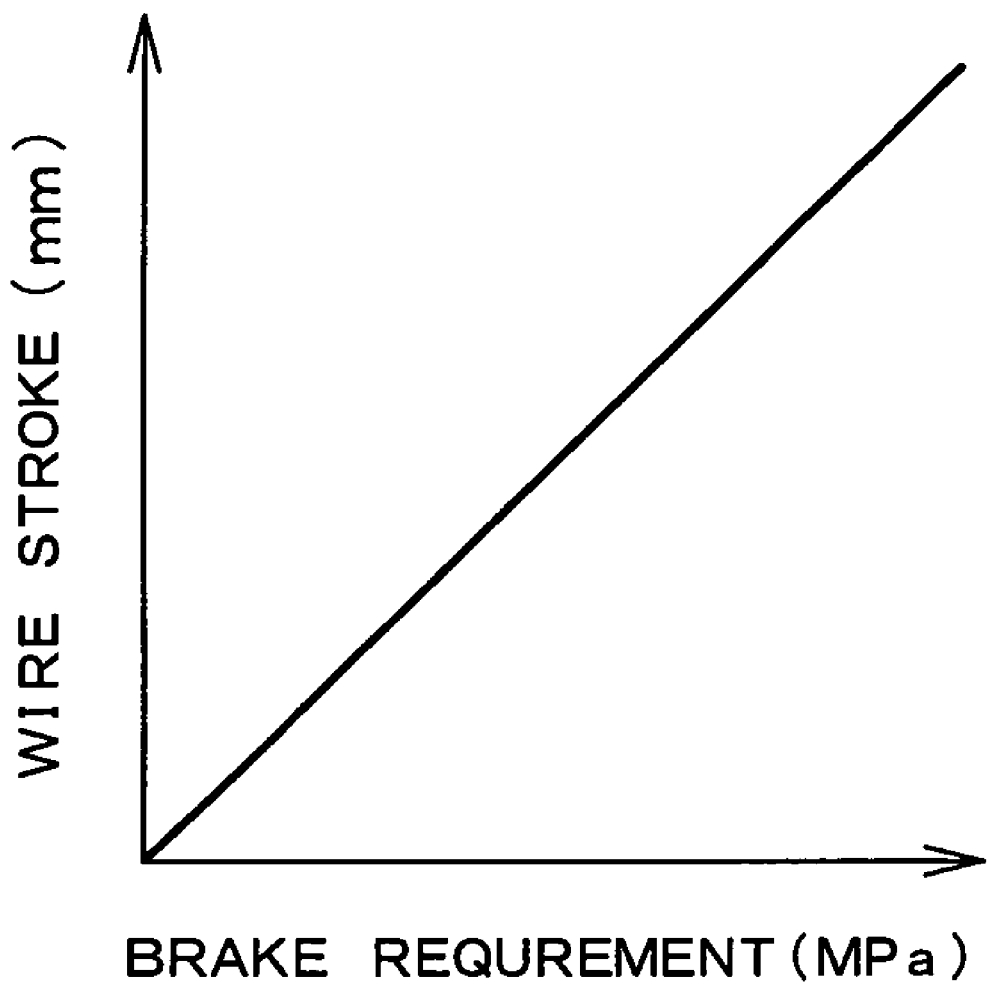
FIG. 24 is a line diagram showing a relationship of a braking force requirement value of the motor-driven PKB and a wire stroke.

At 828, the braking force requirement value is converted into a stroke value based on the relationship of the braking force requirement value (e.g., in MPa units), a stroke of the brake wire 31R and 31L of the motor-driven PKB 3, and the braking force (FIG. 24). It should be noted that, in FIG. 24, the point at which braking force first begins to be generated is designated as a wire stroke of zero mm.

Next, at 830, the present wire stroke and the required stroke value are compared, and if the required stroke value is large the routine proceeds to 832, whereas, if it is small, the routine proceeds to 834.

The point at which braking force first beings to be generated can be distinguished based on the magnitude of the current of the motor of the motor-driven PKB 3, since it is the point at which small current, at a time when there is no load, changes extensively. Accordingly, by detecting and memorizing this point in advance for prior motor-driven PKB 3 operations, it is possible to compare a value that is the sum of the stored value and the required stroke value obtained at 828, with the present wire stroke (the present position).

At 832, the motor drive conditions are set such that drive is executed at a 30% duty ratio with a normal rotation direction, so as to increase the braking force of the motor-driven PKB 3.

At 834, the motor drive conditions are set such that drive is executed at a 30% duty ratio with a reverse rotation direction, so as to decrease the braking force of the motor-driven PKB 3.

On the other hand, when there is no braking force requirement for the motor-driven PKB 3 from the brake adjustment, at 836, it is determined whether there is any history of braking force requirements from the brake adjustment.

If there is a history, namely, if there has been a movement from a state in which there was a braking force requirement to a state in which there was no braking force requirement, it is necessary to release the presently generated braking force of the motor-driven PKB 3. Thus, the routine proceeds to 838. In the case that there is no history, the routine proceeds to 842 and the motor drive conditions are set such that the motor is not driven.

At 838, the motor drive conditions are set such that drive is executed at a 100% duty ratio with a reverse rotation direction, so as to release the braking force of the motor-driven PKB 3.

At 840, it is determined whether the brake wire 31R or 31L has been returned by the wire stroke amount that was generated at 832 since the drive of the motor-driven PKB 3 in the reverse direction started. This determination is based upon whether the rotation amount of the motor has exceeded a total revolution amount. If the result is YES, the routine proceeds to 842 and the motor drive conditions are set such that the motor is not driven; whereas, if the result is NO, the routine proceeds to 824 and drive in the reverse direction of the actuator (the motor) is continued.

As described above, according to the third embodiment, application of braking force to the two rear wheels in the starting assistance control is conducted such that execution is switched between the hydraulic brake device 2 and the motor-driven PKB 3 every time the predetermined time elapses. In other words, it is possible to inhibit damage resulting from heat discharge of the hydraulic brake device 2 since the burden of generating braking force during the vehicle speed deceleration processing when causing the vehicle speed to equal the target creep vehicle speed α is shared by the motor-driven PKB 3.

(Other Embodiments)

According to the aforementioned embodiments, the hydraulic brake device 2 shown in FIG. 2 was employed as an example of the first brake unit that applies braking force to each wheel. However, in addition to this configuration, it is possible to increase the pressure applied to the master cylinder using not only application by normal depression of the brake pedal, but also another controlled hydraulic mechanism that applies pressure independently of the brake pedal force. In other words, it is possible to use a so-called hydro-booster that makes it possible to increase the pressure of the master cylinder even when there is no brake pedal operation.

Moreover, as the first brake unit, a motor-driven brake device may be adopted in which an electric motor is provided in each wheel, and braking force is generated by directly pressing the brake calipers against the brake disk using drive of the electric motor, regardless of hydraulic pressure.

In the above examples, the described configurations function as the first brake unit in which the first braking force is generated based upon the actuating signal, and in which the braking force is cancelled (i.e., braking force equals zero) when the actuating signal is cancelled. Accordingly, it is possible to generate braking force in a highly responsive manner.

While the above description is of the preferred embodiments of the present invention, it should be appreciated that the invention may be modified, altered, or varied without deviating from the scope and fair meaning of the following claims.

What is claimed is:

1. A creep drive control device comprising:
an engine output control unit configured to control an engine output in accordance with an engine control amount;
a braking force control unit that is configured to control a braking force applied to each wheel in accordance with a brake control amount;
an acceleration intention determination unit configured to determine whether a driver has an acceleration intention;
a stop maintenance intention determination unit configured to determine whether the driver has a stop maintenance intention;
a target speed calculation unit for calculating a target speed value in predetermined control cycles;
a target creep speed setting unit configured to set a target creep speed;
a vehicle speed acceleration unit configured to set a vehicle speed by at least one of increasing the engine output and decreasing the braking force;

a vehicle speed deceleration unit configured to decrease a vehicle speed by at least one of decreasing the engine output and increasing the braking force;

a brake pedal operation amount sensor for detecting an operation amount of a brake pedal in every predetermined control cycle;

a starting assistance control unit which, when a result of a determination by the acceleration intention determination unit and a result of a determination by the stop maintenance intention determination unit are negative, is configured to operate using a creep driving mode in which the following occurs:

the target speed calculation unit calculates the target speed value in every predetermined control cycle based on a preset relationship between the brake pedal operation amount, which is detected by the brake operation amount sensor, and the target speed value, so that the target speed value is repeatedly calculated in accordance with the detected brake pedal operation amount;

the preset relationship is that the target speed value decreases as the brake pedal operation amount increases;

the target speed setting unit sets the target speed value as the target creep speed;

the vehicle speed acceleration unit is operated when the vehicle speed is less than a first target vehicle speed, and the first target vehicle speed is smaller than the target creep speed; and the vehicle speed deceleration unit is operated when the vehicle speed is larger than a second target vehicle speed, and the second target vehicle speed is larger than the target creep speed.

2. The creep drive control device according to claim 1, wherein the acceleration intention determination unit is configured to determine that the driver has the acceleration intention when a shift position of an automatic transmission is set to a drive operable position by the driver, and when the acceleration intention determination unit is configured to detect at least one of an accelerator opening being equal to a predetermined amount, the vehicle speed being equal to or above a predetermined value, and the drive of the vehicle being controlled by an automatic driving control other than the control executed by the starting assistance control unit.

3. The creep drive control device according to claim 1, wherein the stop maintenance determination unit is configured to determine that the driver has the stop maintenance intention when the stop maintenance determination unit detects at least one of setting of a shift position of an automatic transmission to a drive inoperable position by the driver, execution of a brake operation that generates braking force capable of causing stop maintenance of the vehicle, and execution of an automatic stop control that automatically stops the vehicle.

4. The creep drive control device according to claim 1, wherein the target creep speed calculation unit is configured to set the target creep speed value by correcting a pre-set reference creep speed in accordance with at least one of a driving state of the vehicle and a road surface condition.

5. The creep drive control device according to claim 4, wherein the target creep speed calculation unit is configured to execute correction such that the target creep speed value becomes larger as an accelerator opening becomes larger.

6. The creep drive control device according to claim 4, wherein the target creep speed calculation unit is configured to execute a correction such that the target creep speed value, when the vehicle is moving in a backward direction, is smaller than the target creep speed value when the vehicle is moving in a forward direction.

7. The creep drive control device according to claim 4, wherein the target creep speed calculation unit is configured to execute a correction such that the target creep speed value becomes smaller as a distance becomes smaller between the vehicle and an obstacle in a forward direction of the vehicle.

8. The creep drive control device according to claim 4, wherein the target creep speed calculation unit is configured to execute a correction such that the target creep speed value becomes larger on a road with a downward gradient, and the target creep speed value becomes smaller on a road with an upward gradient.

9. The creep drive control device according to claim 4, wherein the target creep speed calculation unit is configured to execute a correction such that the target creep speed value becomes larger in accordance with a length of continuation of a state in which the braking force generated by the braking force control unit is equal to or above a predetermined value.

10. The creep drive control device according to claim 1, wherein the target creep speed calculation unit is configured to set, when a deviation between a present vehicle speed and the target creep speed value is larger than a predetermined value, a new target creep speed value that is the sum of the present vehicle speed and a value that accords with the deviation.

11. The creep drive control device according to claim 1, wherein the vehicle speed acceleration unit is configured to increase the vehicle speed by increasing the engine output after decreasing the braking force.

12. The creep drive control device according to claim 1, wherein the vehicle speed deceleration unit is configured to decrease the vehicle speed by increasing the braking force after decreasing the engine output.

13. The creep drive control device according to claim 12, wherein the vehicle speed deceleration unit is configured to decrease the vehicle speed by decreasing the engine output, and following this, increasing a gear ratio of a transmission.

14. The creep drive control device according to claim 1, wherein the vehicle speed acceleration unit is configured to increase the vehicle speed by at least one of being configured to set a second engine control, amount with which the engine output is controlled by the engine output control unit as the sum of the engine control amount and an engine control increase amount, and being configured to set a second brake control amount with which the braking force is controlled by the braking force control unit as the brake control amount minus a brake decrease amount.

15. The creep drive control device according to claim 14, wherein the creep drive control device is configured to respectively set the engine control increase amount and the brake control increase amount in accordance with a deviation between the vehicle speed and the target creep speed.

16. The creep drive control device according to claim 15, wherein the creep drive control device is configured to respectively correct the engine control increase amount and the brake control increase amount in accordance with at least one of a driving state of the vehicle, a road surface condition, and a driving operation of the driver.

17. The creep drive control device according to claim 14, wherein the creep drive control device is configured to set the brake decrease amount by correcting an amount that accords with a deviation between the braking force that accords with the brake control amount and a braking force that accords with the brake pedal operation amount, using at least one of an accelerator opening and a road surface coefficient of friction.

18. The creep drive control device according to claim 14, wherein the vehicle speed acceleration device is configured to execute a correction such that the engine control increase amount becomes smaller in either one of a case that the vehicle speed is a value proximate to zero, and a case that a gradient of a road surface is a downward gradient.

19. The creep drive control device according to claim 14, wherein the vehicle speed acceleration unit is configured to execute a correction such that the engine control increase amount becomes smaller in accordance with any one of an accelerator opening becoming smaller, the brake pedal operation amount becoming larger, and a road surface coefficient of friction becomes smaller.

20. The creep drive control device according to claim 14, wherein, when the vehicle speed increases following a decrease of the engine output by the vehicle speed deceleration unit, the braking force control unit is configured to switch the wheel to which the braking force is applied during a period in which the braking force is applied.

21. The creep drive control device according to claim 14, wherein the braking force control device is provided with a first braking unit that is configured to apply braking force to each wheel, and a second braking unit that is configured to apply braking force to each wheel independently of the first brake unit, and when the vehicle speed increases following a decrease of the engine output by the vehicle speed deceleration unit, the braking force control unit is configured to switch between generation of the braking force by the first braking unit and generation of the braking force by the second braking unit, during a period in which the braking force is applied.

22. The creep drive control device according to claim 1, wherein the vehicle speed deceleration unit is configured to decrease the vehicle speed by at least one of being configured to set a second brake control amount with which the braking force is controlled by the braking force control unit as the sum of the brake control amount and a brake control increase amount, and being configured to set a second engine control amount with which the engine output is controlled by the engine output control unit as the engine control amount minus an engine decrease amount.

23. The creep drive control device according to claim 22, wherein the creep drive control device is configured to set the engine decrease amount by correcting an amount that accords with a deviation between the vehicle speed and the target creep speed, using at least one of the brake pedal operation amount and a road surface coefficient of friction.

24. The creep drive control device according to claim 22, wherein the vehicle speed deceleration unit is configured to execute a correction such that the brake control increase amount becomes larger in accordance with any one of an accelerator opening becoming smaller, the brake pedal operation amount becoming larger, and a road surface coefficient of friction becoming larger.

25. The creep drive control device according to claim 22, wherein the vehicle speed deceleration unit is configured to execute a correction such that the brake control increase amount becomes larger when a gradient of a road surfhce is a downward gradient.

26. The creep drive control device according to claim 1, wherein the vehicle speed acceleration unit is configured to limit the engine control amount such that the engine control amount is equal to or less than an upper limit value.

27. The creep drive control device according to claim 26, wherein the vehicle speed acceleration unit is configured to execute a correction of the upper limit value in accordance with at least one of a driving state of the vehicle, a road surface condition, and a driving operation of the driver.

28. The creep control device according to claim 26, wherein, when the vehicle speed acceleration unit is configured to limit the engine control amount to being equal to or less than the upper limit value, the vehicle speed acceleration unit is configured to suspend engine output control when the vehicle is either one of stationary and moving in a direction opposite to a direction of travel of the vehicle, and along with this, the starting assistance control unit is configured to cause the braking force control unit to generate a stop maintenance braking force for stop maintenance of the vehicle.

29. The creep drive control device according to claim 1, wherein the starting assistance control unit is configured to cause the engine control amount to change such that the engine control amount agrees with an amount that accords with an accelerator pedal operation amount of the driver, when the creep driving mode is completed.

30. The creep drive control device according to claim 1, wherein the starting assistance control unit is configured to cause the brake control amount to change such that the brake control amount agrees with an amount that accords with the brake pedal operation amount, when the creep driving mode is completed.

31. The creep drive control device according to claim 1, wherein the creep drive control device includes a hydraulic brake device in which a master cylinder pressure, which is generated based on operation of a brake pedal, is transmitted to wheel cylinders, and the creep drive control device is conligured to execute the control without transmitting the master cylinder pressure to the wheel cylinders.

32. The creep drive control device according to claim 1, wherein the control is executed such that the vehicle speed becomes a value within a fixed range, wherein an upper limit of the fixed range does not exceed 10 km/h.

33. A creep drive control device configured to execute, when a driver of a vehicle does not have either an intention to accelerate the vehicle or an intention to maintain stopping of the vehicle, at least one of adjustment of a braking force and adjustment of a driving force applied to the vehicle so as to execute predetermined control cycles such that a vehicle speed becomes a value within a fixed range, wherein an upper limit of the fixed range does not exceed 10 km/h, and such that the speed of the vehicle becomes a predetermined target speed, wherein
the creep drive control device includes:
a brake pedal operation amount sensor for detecting an operation amount of the brake pedal in every predetermined control cycle;
a target speed calculation unit for calculating a target speed value in every predetermined control cycle based at least on the detected brake pedal operation amount and a preset relationship between the target speed value and the amount of brake pedal operation, so that the target speed value is repeptedly calculated in accordance with the detected brake pedal operation amount; and
a target speed setting unit for setting the target speed value calculated by the target speed calculation unit as the target speed; and
the preset relationship between the target speed value and the brake pedal operation amount is that the greater the amount of brake pedal operation is, the smaller the target speed value is.

34. The creep drive control device according to claim 33, wherein the creep drive control device includes a hydraulic brake device in which a master cylinder pressure, which is generated based on operation of a brake pedal, is transmitted to wheel cylinders, and the creep drive control device is configured to execute the control without transmitting the master cylinder pressure to the wheel cylinders.

* * * * *